US008543742B2

(12) United States Patent
Yu et al.

(10) Patent No.: US 8,543,742 B2
(45) Date of Patent: Sep. 24, 2013

(54) FLASH-MEMORY DEVICE WITH RAID-TYPE CONTROLLER

(75) Inventors: Frank Yu, Palo Alto, CA (US); Abraham C. Ma, Fremont, CA (US); Shimon Chen, Los Gatos, CA (US)

(73) Assignee: Super Talent Electronics, Inc., San Jose, CA (US)

( * ) Notice: Subject to any disclaimer, the term of this patent is extended or adjusted under 35 U.S.C. 154(b) by 0 days.

(21) Appl. No.: 13/494,409

(22) Filed: Jun. 12, 2012

(65) Prior Publication Data

US 2012/0278543 A1 Nov. 1, 2012

Related U.S. Application Data

(60) Continuation-in-part of application No. 12/950,533, filed on Nov. 19, 2010, now abandoned, and a continuation-in-part of application No. 12/128,916, filed on May 29, 2008, now Pat. No. 7,552,251, and a continuation-in-part of application No. 12/252,155, filed on Oct. 15, 2008, now Pat. No. 8,037,234, and a continuation-in-part of application No. 12/418,550, filed on Apr. 3, 2009, now abandoned, and a continuation-in-part of application No. 12/475,457, filed on May 29, 2009, now Pat. No. 8,266,367, and a continuation-in-part of application No. 12/576,216, filed on Oct. 8, 2009, now Pat. No. 8,452,912, and a continuation-in-part of application No. 11/924,448, filed on Oct. 25, 2007, now abandoned, and a continuation-in-part of application No. 11/677,658, filed on Feb. 22, 2007, now abandoned, and a continuation-in-part of application No. 12/186,471, filed on Aug. 5, 2008, now Pat. No. 8,341,332, and a division of application No. 13/197,721, filed on Aug. 3, 2011, now Pat. No. 8,321,597.

(51) Int. Cl.
*G06F 13/28* (2006.01)
*G06F 3/00* (2006.01)
*G06F 11/00* (2006.01)

(52) U.S. Cl.
USPC .................... 710/22; 710/8; 710/36; 714/100

(58) Field of Classification Search
None
See application file for complete search history.

(56) References Cited

U.S. PATENT DOCUMENTS

| 7,861,122 | B2 * | 12/2010 | Cornwell et al. | 714/42 |
| 2007/0214255 | A1 * | 9/2007 | Spitz et al. | 709/224 |
| 2007/0276996 | A1 * | 11/2007 | Caulkins et al. | 711/113 |

* cited by examiner

*Primary Examiner* — Alan Chen
(74) *Attorney, Agent, or Firm* — Stuart T. Auvinen; gPatent LLC

(57) ABSTRACT

A smart flash drive has one or more levels of smart storage switches and a lower level of single-chip flash devices (SCFD's). A SCFD contains flash memory and controllers that perform low-level bad-block mapping and wear-leveling and logical-to-physical block mapping. The SCFD report their capacity, arrangement, and maximum wear-level count (WLC) and bad block number (BBN) to the upstream smart storage switch, which stores this information in a structure register. The smart storage switch selects the SCFD with the maximum BBN as the target and the SCFD with the lowest maximum WLC as the source of a swap for wear leveling when a WLC exceeds a threshold that rises over time. A top-level smart storage switch receives consolidated capacity, arrangement, WLC, and BBN information from lower-level smart storage switch. Data is striped and optionally scrambled by Redundant Array of Individual Disks (RAID) controllers in all levels of smart storage switches.

18 Claims, 20 Drawing Sheets

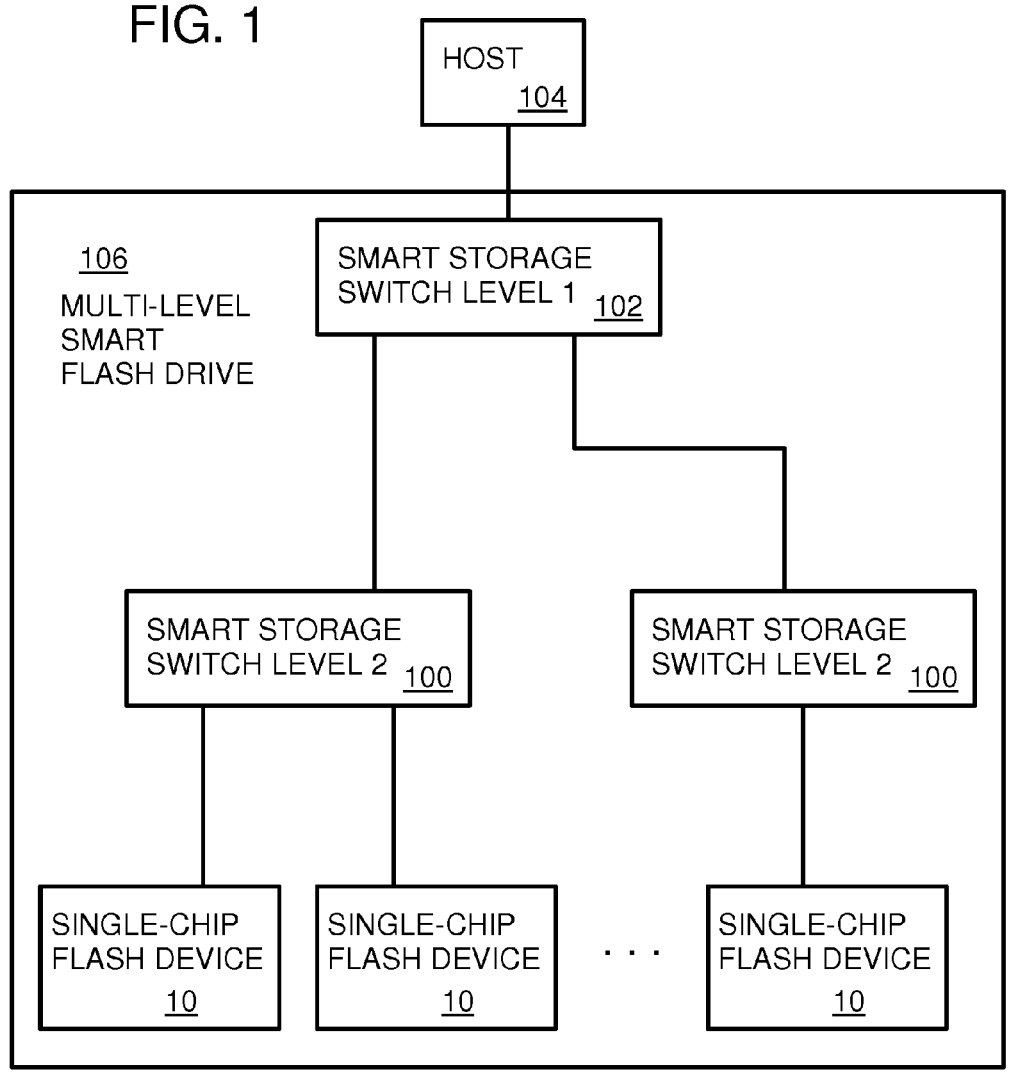

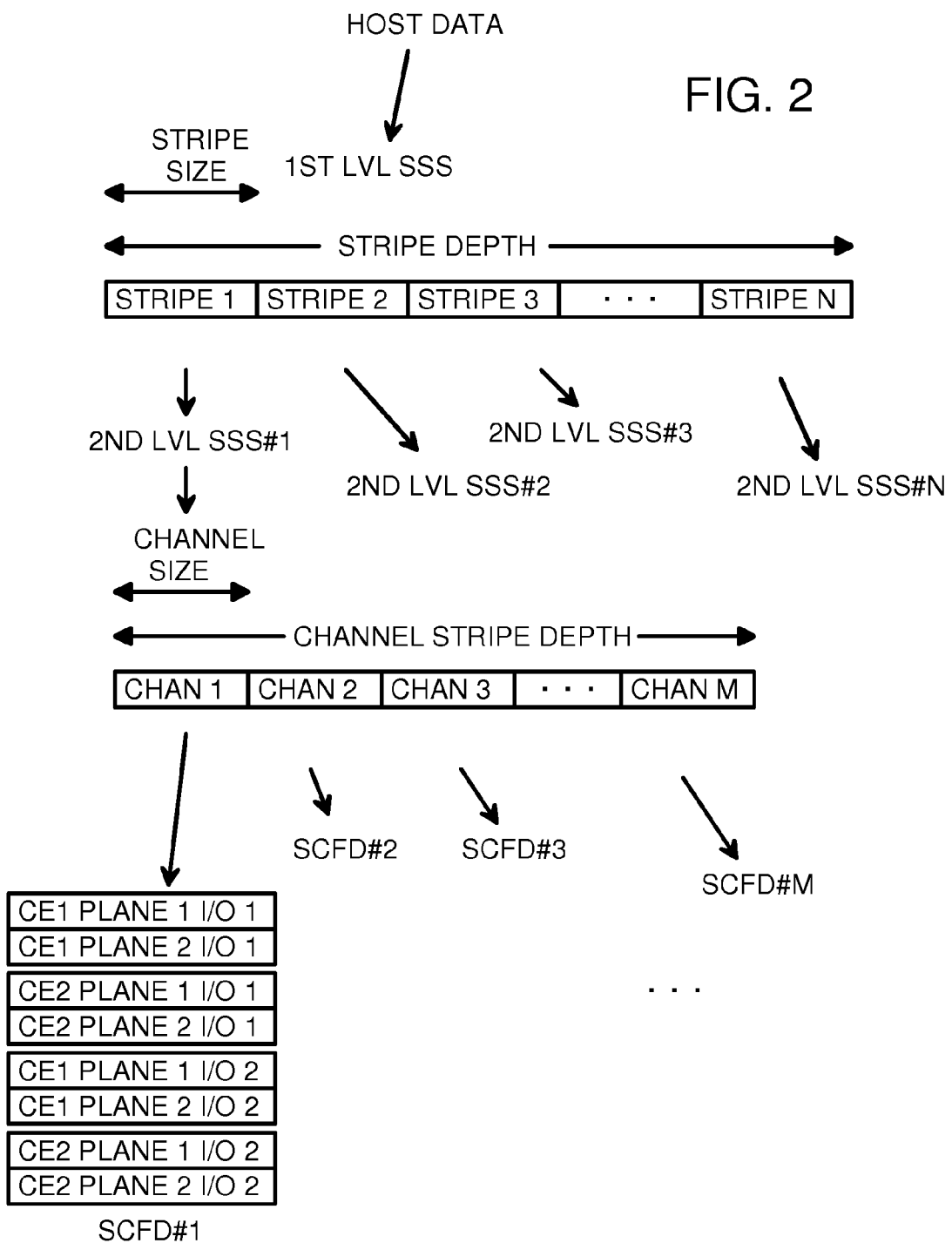

|       | SCFD#0 | SCFD#1 | SCFD#2 | SCFD#N-1 |
|-------|--------|--------|--------|----------|
| LSA=  |        |        |        |          |
| PSA#0 | 0      | 1      | 2      | N-1      |
| PSA#1 | N      | N+1    | N+2    | 2N-1     |
| PSA#2 | 2N     | 2N+1   | 2N+2   | 3N-1     |
| PSA#3 | 3N     | 3N+1   | 3N+2   | 4N-1     |

FIG. 3A    RAID0

| LSA | PSA (SCFD#,PSA#) |
|-----|------------------|
| 0   | 0,0              |
| 1   | 1,0              |
| 2   | 2,0              |
| 3   | 3,0              |
| ⋮   | ⋮                |
| N-1 | N-1,0            |
| N   | 0,1              |
| N+1 | 1,1              |
| ⋮   | ⋮                |
| 2N-1| N-1,1            |
| 2N  | 0,2              |
| 2N+1| 1,2              |
| ⋮   | ⋮                |

RAID0

FIG. 3B

| LSA | PSA (SCFD#,PSA#) |
|-----|------------------|
| 0   | N-1,0            |
| 1   | 1,0              |
| 2   | N-2,0            |
| 3   | 3,0              |
| ⋮   | ⋮                |
| N-1 | 0,0              |
| N   | N-1,1            |
| N+1 | 1,1              |
| ⋮   | ⋮                |
| 2N-1| 0,1              |
| 2N  | N-1,2            |
| 2N+1| 1,2              |
| ⋮   | ⋮                |

RAID0, SCRAMBLED

FIG. 3C

STRIPE MODE

US 8,543,742 B2

FLASH-MEMORY DEVICE WITH RAID-TYPE CONTROLLER

RELATED APPLICATION

This application is a divisional of the application for "Flash-Memory Device with RAID-Type Controller", U.S. Ser. No. 13/197,721, filed on Aug. 3, 2011, now U.S. Pat. No. 8,321,597.

This application is a continuation of the application for "Single-Chip Multi-Media Card/Secure Digital (MMC/SD) Controller Reading Power-On Boot Code from Integrated Flash Memory for User Storage", U.S. Ser. No. 12/950,533, filed on Nov. 19, 2010, and U.S. Ser. No. 12/128,916, filed on May 29, 2008, now U.S. Pat. No. 7,552,251.

This application is a continuation-in-part of "Command Queuing Smart Storage Transfer Manager for Striping Data to Raw-NAND Flash Modules", U.S. Ser. No. 12/252,155, filed Oct. 15, 2008.

This application is a continuation-in-part of "Hybrid 2-Level Mapping Tables For Hybrid Block- and Page-Mode Flash-Memory System", U.S. Ser. No. 12/418,550, filed Apr. 3, 2009.

This application is a continuation-in-part of "Multi-Level Striping and Truncation Channel-Equalization for Flash-Memory System", U.S. Ser. No. 12/475,457, filed May 29, 2009.

This application is a continuation-in-part of "Flash-Memory System with Enhanced Smart-Storage Switch and Packed Meta-Data Cache for Mitigating Write Amplification by Delaying and Merging Writes until a Host Read", U.S. Ser. No. 12/576,216, filed Oct. 8, 2009.

This application is a continuation-in-part of "Portable Electronic Storage Devices with Hardware Security Based on Advanced Encryption Standard", U.S. Ser. No. 11/924,448, filed Oct. 25, 2007.

This application is a continuation-in-part of "Content Protection Using Encryption Key Embedded with Content File", U.S. Ser. No. 11/677,658, filed Feb. 22, 2007.

This application is a continuation-in-part of "Multi-Level Controller with Smart Storage Transfer Manager for Interleaving Multiple Single-Chip Flash Memory Devices", U.S. Ser. No. 12/186,471, filed Aug. 5, 2008.

FIELD OF THE INVENTION

This invention relates to solid-state-drive (SSD) flash-memory systems, and more particularly to multi-level Redundant Array of Individual Disks (RAID) flash architectures.

BACKGROUND OF THE INVENTION

Flash memory is replacing hard disks and optical disks as the preferred mass-storage medium. Host systems such as Personal Computers (PC's) store large amounts of data in mass-storage devices such as hard disk drives (HDD). Mass-storage devices are sector-addressable rather than byte-addressable, since the smallest unit of flash memory that can be read or written is a page that is several 512-byte sectors in size.

NAND flash memory is a type of flash memory constructed from electrically-erasable programmable read-only memory (EEPROM) cells, which have floating gate transistors. These cells use quantum-mechanical tunnel injection for writing and tunnel release for erasing. NAND flash is non-volatile so it is ideal for portable devices storing data. NAND flash tends to be denser and less expensive than NOR flash memory.

One limitation of NAND flash is that when storing data (writing to flash), the flash can only write from ones (1) to zeros (0). When writing from zeros (0) to ones (1), the flash needs to be erased a "block" at a time. Although the smallest unit for read can be a byte or a word within a page, the smallest unit for erase is a block.

Another limitation is that NAND flash memory has a finite number of erase cycles between 10,000 and 100,000, after which the flash wears out and becomes unreliable.

A consumer may desire a large capacity flash-memory system, perhaps as a replacement for a hard disk or for storing data for a smart phone. A solid-state disk (SSD) made from flash-memory chips has no moving parts and is thus more reliable than a rotating disk.

Several smaller flash drives could be connected together, such as by plugging many flash drives into a USB hub that is connected to one USB port on a host, but then these flash drives appear as separate drives to the host. For example, the host's operating system may assign each flash drive its own drive letter (D:, E:, F:, etc.) rather than aggregate them together as one logical drive, with one drive letter.

Larger flash systems may use multiple channels to allow parallel access, improving performance. A wear-leveling algorithm allows the memory controller to remap logical addresses to any different physical addresses so that data writes can be evenly distributed. Thus the wear-leveling algorithm extends the endurance of the flash memory.

Multi-channel flash systems may have several channels that data is striped across. As the flash memory system wears, more bad blocks appear, reducing the available storage capacity. Since these bad blocks may appear at random locations, the channels may diverge in capacity over time. When channels have widely differing available capacities, much space is wasted in the larger channels.

Plug-n-Play USB or other flash devices are desirable that can be booted from an OS image stored in the flash memory. It is sometimes desirable to support multiple operating systems (OS's). A single flash drive that can store multiple OS images is more desirable than current USB drives that can only boot one OS. Mapping multiple OS images across channels and devices is problematic. Data may be encrypted and password-protected for security. Passwords or keys that are stored on the flash drive are desirable. There may be different levels of access or enablement for different levels of users.

What is desired is a multi-channel flash system that supports security. A mapping structure is desirable to map logical addresses to physical blocks in the flash memory. Wear-leveling and bad block management is desirable. Support for multiple operating system images is also desired. Redundant Array of Individual Disks (RAID) striping is desirable. A multi-level smart flash drive is desirable that can support these features.

BRIEF DESCRIPTION OF THE DRAWINGS

FIG. 1 shows two levels of smart storage switches using flash memory with multiple levels of integrated controllers.

FIG. 2 shows three levels of data striping in a two-level structure.

FIG. 3A illustrates striping data across SCFD using RAID0.

FIGS. 3B-C show a mapping table in the top-level smart storage switch.

DETAILED DESCRIPTION

Figure 4:
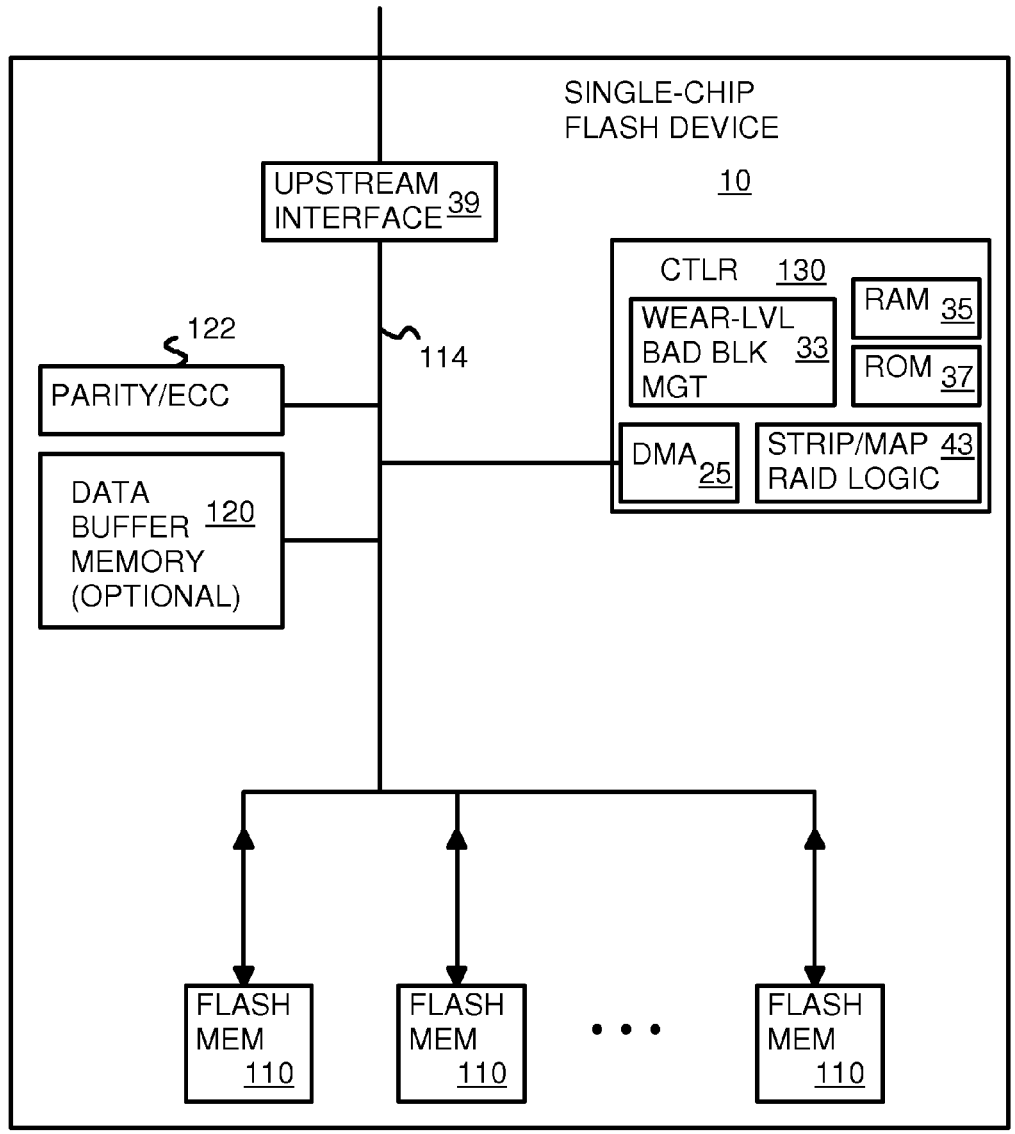
FIG. 4 show a single-chip flash device (SCFD).

The present invention relates to an improvement in smart flash drives. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

FIG. 1 shows two levels of smart storage switches using single-chip flash devices with multiple levels of integrated controllers. First-level smart storage switch 102 is part of multi-level smart flash drive 106 and connects to host 104 over a host storage bus. First-level smart storage switch 102 is connected to multiple second-level mart storage switches 100.

Second-level smart storage switches 100 connect to downstream single-chip flash devices (SCFD) 10.

First-level smart storage switch 102 is used to interface to host 104 and to connect to multiple second-level smart storage switches 100. Second-level smart storage switches 100 further connect to multiple SCFD 10. Cascading smart storage switches 102, 100 can make the controllers less complicated. First-level smart storage switch 102 and second-level smart storage switch 100 can share the same design circuits.

Features such as encryption, RAID striping, and remapping can be enabled or disabled at the various levels of smart storage switches 100, 102. Multiple levels allows for better partitioning and optimization of many complex functions.

Multi-Level Striping—FIG. 2

The three levels of controllers shown in FIG. 1 include a first-level smart storage switch that receives host data and distributes the data across N channels. Each of these channels connects to a second-level smart storage switch. Then each second-level smart storage switch further distributes that channel's data across M single-chip flash devices (SCFD) per second-level smart storage switch. Each SCFD can have several die and several planes per die, allowing further striping at the third level by each SCFD.

FIG. 2 shows three levels of data striping. Data from the host is stored by the first-level smart storage switch as stripes with a stripe depth of N times the stripe size. Each stripe is sent to a different one of the N second-level smart storage switches.

At the second level, each second-level smart storage switch has M channels that connect to SCFD's. There are a total of M SCFD's per second-level smart storage switch. The channel stripe size is M times the channel size.

At the third level, each SCFD distributes data to flash memory that may be partitioned into several die, and several planes per die. The data width can be 8, 16, 32, or some other number of bits per plane. CE1 is the chip-enable for die 1, while CE2 is the chip-enable for die 2 for the first 8-bit I/O. CE3 is the chip-enable for die 3, while CE4 is the chip-enable for die 4 for the second 8-bit I/O. In some embodiments, CE3 and CE4 can be tied to CE1 and CE2. In this example there are 4 NVM die per SCFD, and 2 planes per die, with a data width to NVM die of 16 bits. SCFD 10 of FIG. 1 and other figures may have four flash-memory die per SCFD package, and each flash memory die has two planes. Having four die per package, and two planes per die increases flash access speed by utilizing two-plane commands of flash memory. Stacking with multi-CE's and multi-I/O's into one small package also can apply to non-SCFD portable devices such as SD, micro-SD, SSD, USB, etc. to save space.

For the example of FIG. 2, if each flash writing unit is a page (such as 4K bytes per page), the writing unit for each one of M SCFD (each with four dies) is 32K bytes. The writing unit for each second-level smart storage switch 100 (each having M SCFDs) is 32K*M bytes. The writing unit for each first-level smart storage switch 102 (each having N second-level smart storage switches 100) is 32K*M*N bytes, where N is stripe size as shown in FIG. 2.

FIG. 3A illustrates striping data across SCFD using RAID0 in a single-level smart storage switch. There is one SCFD per channel. For RAID0, data from host 104 is striped across of all N SCFDs before repeating with the next N stripe of each SCFD. If the SCFD have four dies with 4K bytes per page, the writing unit is 32K bytes. With N SCFDs, 32K*N bytes is the repeating size. The LSA is the Logical Stripe Address and PSA is the Physical Stripe Address, each using 32K bytes as the unit. The LSA is sent by host 104 with the LSA# starting with 0.

FIG. 3B shows a mapping table in second-level smart storage switch 100. The Logical-Stripe Address (LSA) from first-level smart storage switch 102 is received by second-level smart storage switch 100 and looked up in a table similar to the one shown in FIG. 3B. The Physical Stripe Address (PSA) is the combination of the SCFD that receives the sector data and the sector within the SCFD.

Physical stripes 0 of each SCFD are filled first, then physical stripes 1 of all SCFD, etc. Data can be better protected by scrambling the order of the SCFD assigned for each stripe, as shown in FIG. 3C. Other more complex striping may be performed such as for RAID5 or JBOD.

FIG. 4 show a single-chip flash device (SCFD). SCFD 10 has upstream interface 31 that connects to an upstream controller such as second-level smart storage switches 100 (FIG. 1). Internal bus 114 carries commands, addresses, and data from the upstream controller to flash memory 110. Flash memory 110 can be multiple flash die that are mounted within SCFD 10, or could be separate packaged flash memory.

Parity and error-correction code (ECC) controller 122 generates ECC or parity for data being written to flash memory 110, and checks ECC and parity for data read from flash memory 110. Data may be stored in data buffer memory 120 before being written to flash memory 110, or as a cache of flash memory 110. Data buffer memory 120 is optional.

Controller 130 includes direct-memory access (DMA) engine 25 that can be programmed to move blocks of data along internal bus 114, such as between upstream interface 31 and data buffer memory 120, or between data buffer memory 120 and flash memory 110. The arrangement of the data may be altered by striping RAID mapping logic 43, which may change the sequence of data transferred by DMA engine 25 to implement striping such as shown in FIGS. 2, 3, or other striping schemes.

Wear-level and bad block manager 33 performs wear leveling of physical blocks in flash memory 110, and also removes bad physical blocks from the available physical blocks that can be mapped. ROM 37 may contain programmable routines to implement controller functions, while RAM 35 is used as a scratch pad for those routines.

Figure 5A:
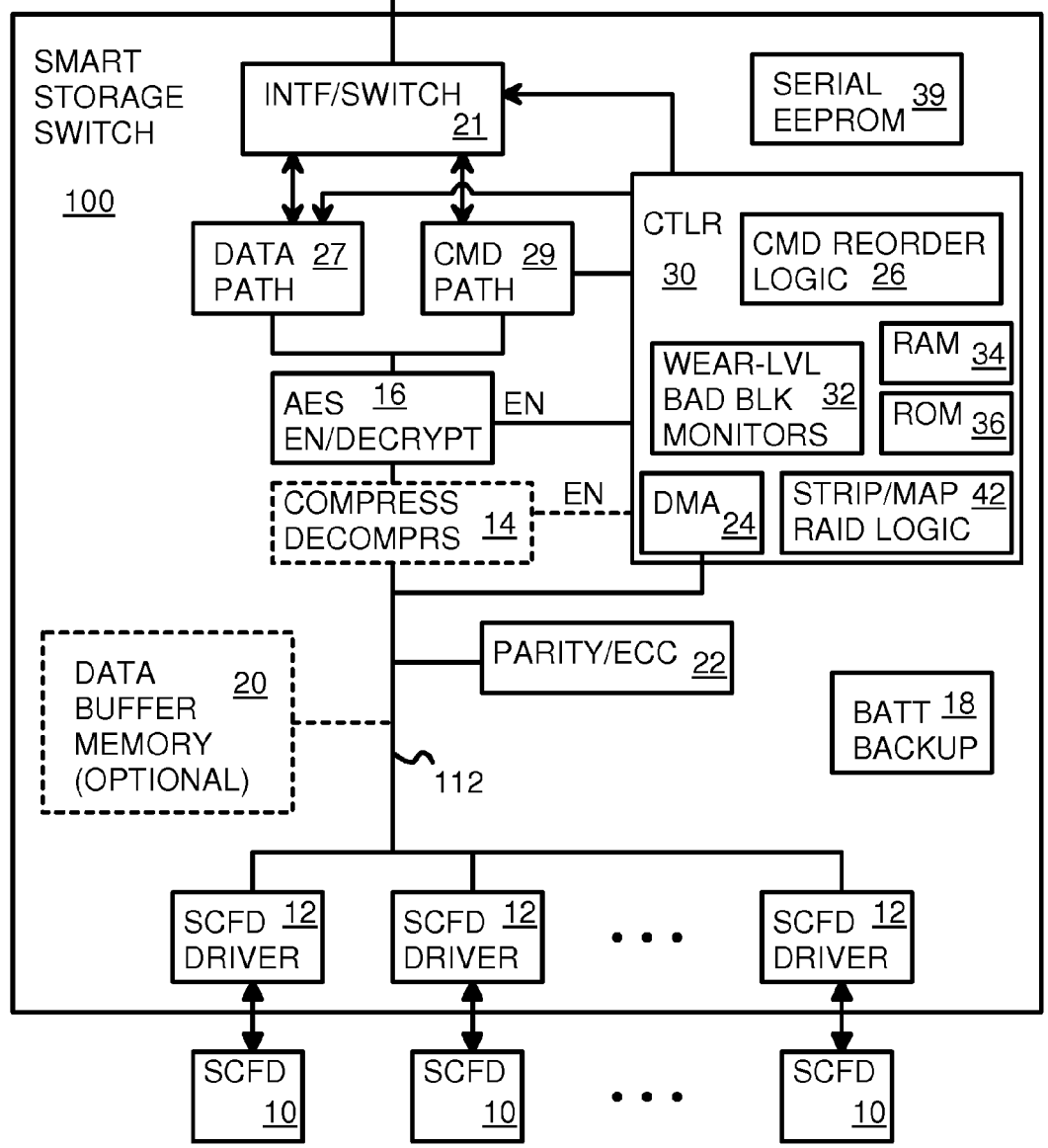
FIG. 5A shows a smart storage switch for use with multiple levels of controllers and external SCFD.

FIG. 5 shows a smart storage switch for use with multiple levels of controllers and external SCFD. Smart storage switch 100 is part of multi-level smart flash drive 106 (FIG. 1) and connects to host 104 or to an upstream first-level smart storage switch 102 over a host storage bus through upstream interface and switch 21. Switch 21 separates commands to command path 29 and data to data path 27. Command path 29 and data path 27 are optional. Smart storage switch 100 also connects to downstream SCFD 10 through SCFD drivers 12.

SCFD drivers 12 provide physical signaling, such as driving and receiving differential signals on any differential data lines, detecting or generating packet start or stop patterns, checking or generating checksums, and higher-level functions such as protocol conversion, inserting or extracting device addresses and packet types and commands. SCFD drivers 12 are protocol drivers, such as for MMC, SSD, etc. For example, when SCFD 10 is an eMMC device, SCFD drivers 12 is a MMC protocol driver.

Data buffer memory 20 (optional) can store the sector data when the host writes data to a flash drive, and temporarily hold data while the host is fetching from flash memories. Data buffer memory 20 also can be used as temporary data storage or a cache for performing Write-Back, Write-Thru, or Read-Ahead Caching.

Parity and error-correction code (ECC) controller 122 generates ECC or parity for data being written to SCFD 10, and checks ECC and parity for data read from SCFD 10. Data may be stored in data buffer memory 120 before being written to SCFD 10, or as a cache of SCFD 10.

Controller 30 includes direct-memory access (DMA) engine 24 that can be programmed to move blocks of data along internal bus 112, such as between upstream interface 38 and data buffer memory 20, or between data buffer memory 20 and SCFD drivers 12. The arrangement of the data may be altered by striping RAID mapping logic 42, which may change the sequence of data transferred by DMA engine 24 to implement striping such as shown in FIGS. 2, 3, or other striping schemes.

Wear-level and bad block monitors 32 perform wear leveling of SCFD 10. Firmware commands similar to SMART commands from the host are used to retrieve information from each SCFD 10 to monitor the health condition of each SCFD. In case of one of the SCFD 10's condition is close to the end of its life, controller 30 informs the host or replies to the host's SMART command to take action by replacing and rebuilding a new SCFD into the system. ROM 36 may contain programmable routines to implement controller functions, while RAM 34 is used as a scratch pad for those routines.

Striping RAID mapping logic 42 provides striping services for SCFD 10. For example, logical addresses from the host can be calculated and translated into logical stripe addresses (LSA) that are sent over internal bus 112 to SCFD 10 controlled by SCFD drivers 12. Host data may be alternately assigned to flash memory in an interleaved fashion by striping RAID mapping logic 42. Smart storage switch 100 may then perform a lower-level interleaving among SCFD 10. Thus interleaving may be performed on two levels, both at a higher level by SCFD 10 among two or more second-level smart storage switches 100, and by each second-level smart storage switches 100 among multiple SCFD 10.

When operating in single-endpoint mode, second-level smart storage switches 100 not only buffers data using data buffer memory 20, but can also re-order packets for different transactions (commands) from the host using command reordering logic 26. A transaction may have several packets, such as an initial command packet to start a memory read, a data packet from the memory device back to the host, and a handshake packet to end the transaction. Rather than have all packets for a first transaction complete before the next transaction begins, packets for the next transaction can be re-ordered by command reordering logic 26 and sent to data buffer memory 20 for buffering. This allows more time for memory access to occur for the next transaction. Transactions are thus overlapped by re-ordering packets.

Packets sent over upstream interface and switch 21 and data path 29 are re-ordered relative to the packet order on the host storage bus. Command reordering logic 26 may overlap and interleave transactions to different SCFD 10 controlled by SCFD drivers 12, allowing for improved data throughput. For example, packets for several incoming host transactions are stored in data buffer memory 20 or an associated buffer (not shown). Command reordering logic 26 examines these buffered transactions and packets and re-orders the packets before sending them over internal bus 112 to SCFD drivers 12, then to one of the downstream SCFD 10.

A packet to begin a memory read of a flash block may be re-ordered ahead of a packet ending a read of another flash block to allow access to begin earlier for the second flash block.

Encryption and decryption of data may be performed by encryptor/decryptor 16 for data passing over internal bus 112. Upstream interface and switch 21 and data path 27 may be configured to divert data streams through encryptor/decryptor 16, which can be controlled by a software or hardware switch to enable or disable the function. This function can be an Advanced Encryption Standard (AES), IEEE 1667 standard, etc, which will authenticate the transient storage devices with the host system either through hardware or software programming. The methodology can be referenced to U.S. application Ser. No. 11/924,448, filed Oct. 25, 2007. Battery backup 18 can provide power to smart storage switch 100 when the primary power fails, allowing write data to be stored into flash. Thus a write-back caching scheme may be used with battery backup 18 rather than only a write-through scheme.

Data path 27 may be configured to divert data streams through compressor 14 to compress the data when enabled by controller 30. Data read from SCFD 10 may be de-compressed by compressor 14 during reading. In a two-level smart-storage switch system, compressor 14 and encryptor/decryptor 16 in smart-storage switch 102 can be enabled and in smart-storage switch 100 both are disabled. When data is operated upon by encryptor/decryptor 16, or by compressor 14, the data may pass directly through on internal bus 112 without buffering delays through data buffer memory 20.

Serial EEPROM 39 stores configuration and other control information that is used by controller 30. For example, the number, size, and arrangement of SCFD 10 may be stored in serial EEPROM 39.

Figure 5B:
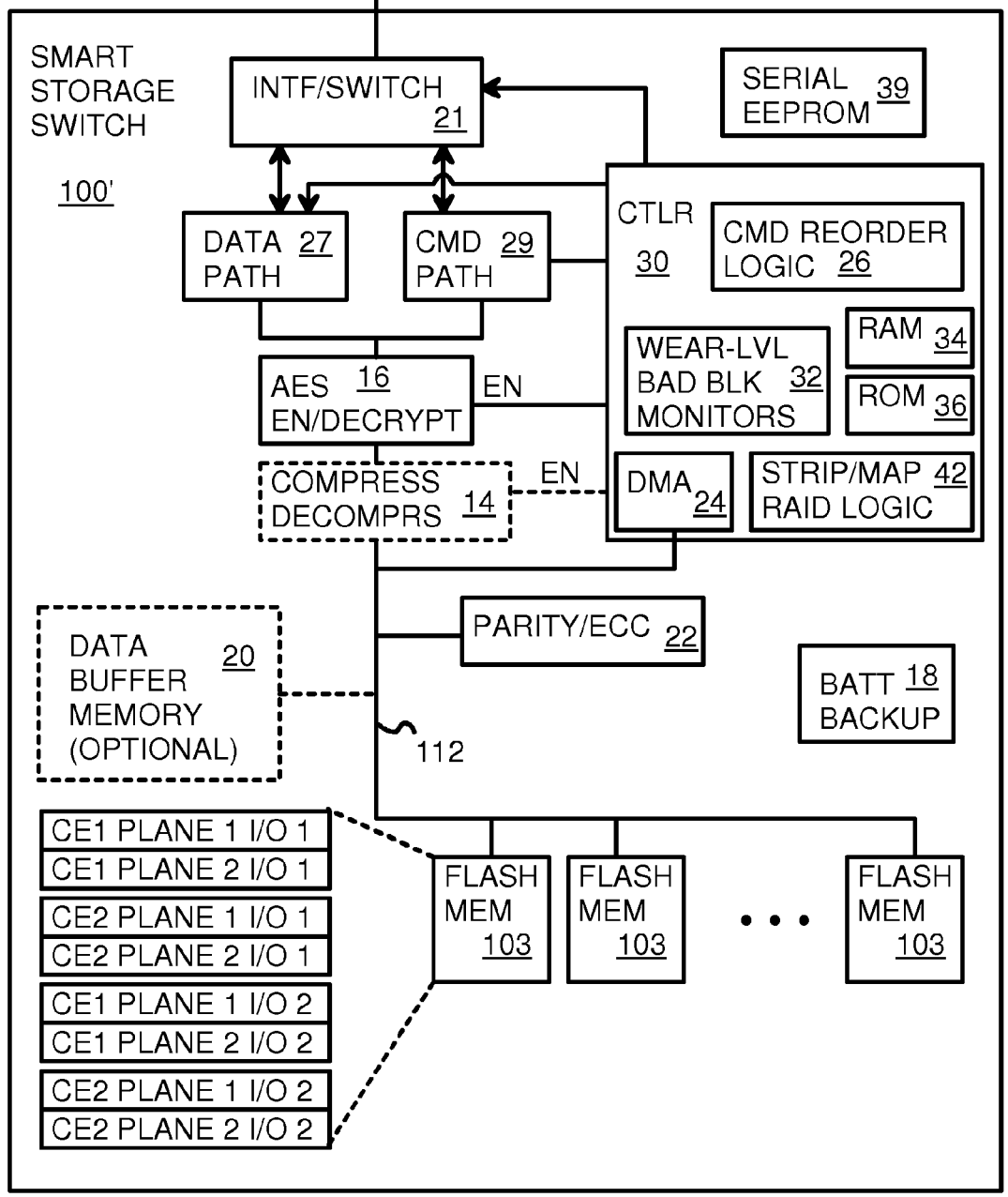
FIG. 5B shows a smart storage switch flash device.

FIG. 5B shows a smart storage switch flash device. Flash device 100' is similar to smart storage switch 100 of FIG. 5A, but flash memory 103 are integrated with internal bus 112. Each of flash memory 103 has two internal chip enables and two internal I/O and two internal planes, for a total of 8 combinations.

Figure 6:
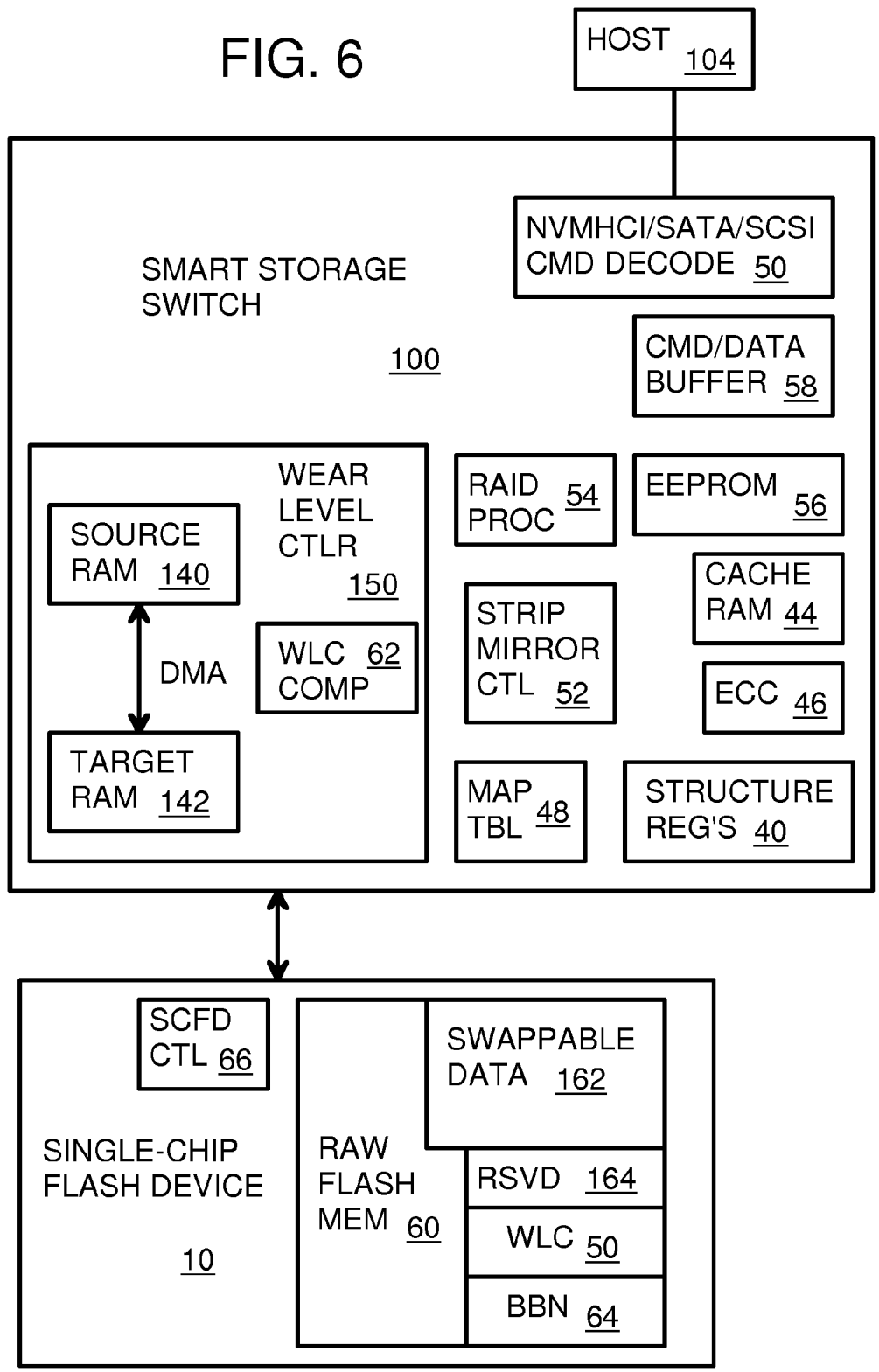
FIG. 6 shows a single-level smart flash drive.

FIG. 6 shows a single-level smart flash drive. Host 104 sends commands, addresses, and data to smart storage switch 100, where command decoder 50 decodes the host command using a host-bus protocol such as Serial AT-Attachment (SATA), Small-Computer System Interface (SCSI), Non-Volatile-Memory Host Command Interface (NVMHCI), etc.

Data, addresses, and commands may be buffered in command buffer 58. The data are mapped to one or more SCFD 10 using mapping table 48. The data may be striped across several channels by striping and mirroring controller 52, which can also mirror data for redundancy. RAID processor 54 works with striping and mirroring controller 52 to implement a desired type of RAID.

ECC may be added to data by ECC processor 46, and ECC words may be checked during reads from flash memory. Frequently-accessed data may be cached by cache RAM 44, which may also be used for buffered writes if a separate write buffer is not available. EEPROM 56 stores control programs and routines that are executed by smart storage switches 100.

Structure registers 40 store configuration information about downstream devices such as SCFD 10. The number of SCFD, their capacities, arrangements, manufacturer's information, and any plane information is stored in structure registers 40 after smart storage switch 100 polls downstream devices during initialization.

Wear level controller 150 tracks high-level wear-leveling for SCFD. Each SCFD 10 performs its own wear leveling and bad block management, but reports statistics such as the number of bad blocks and the highest wear-level count back up to smart storage switch 100. Wear-level controller 150 can swap physical blocks between two SCFD 10 using a DMA engine operating on flash data moved from SCFD 10 to source RAM 140 and target RAM 142. Wear-level-count comparator 62 compares wear-level counts reported from the downstream SCFD 10 to make decisions on block swapping for wear leveling.

SCFD 10 stores data in raw flash memory 60, which can be several flash die packaged together, or a macro block on a single-die layout. The data stored in raw flash memory 60 can include swappable data 162, which are the physical blocks of data. Reserved area 164 may be used for a variety of purposes. Wear-level counters 50 and bad block identifiers 64 are associated with physical blocks stored in swappable data 162. bad block identifiers 64 is a table that tracks which physical blocks are bad blocks to avoid using. Wear-level counters 50 are used for bookkeeping the erase count of each physical block. SCFD controller 66 manages data in raw flash memory 60 and performs low-level wear-level swapping of physical blocks and bad block identification and management of raw flash memory 60.

Figure 7:
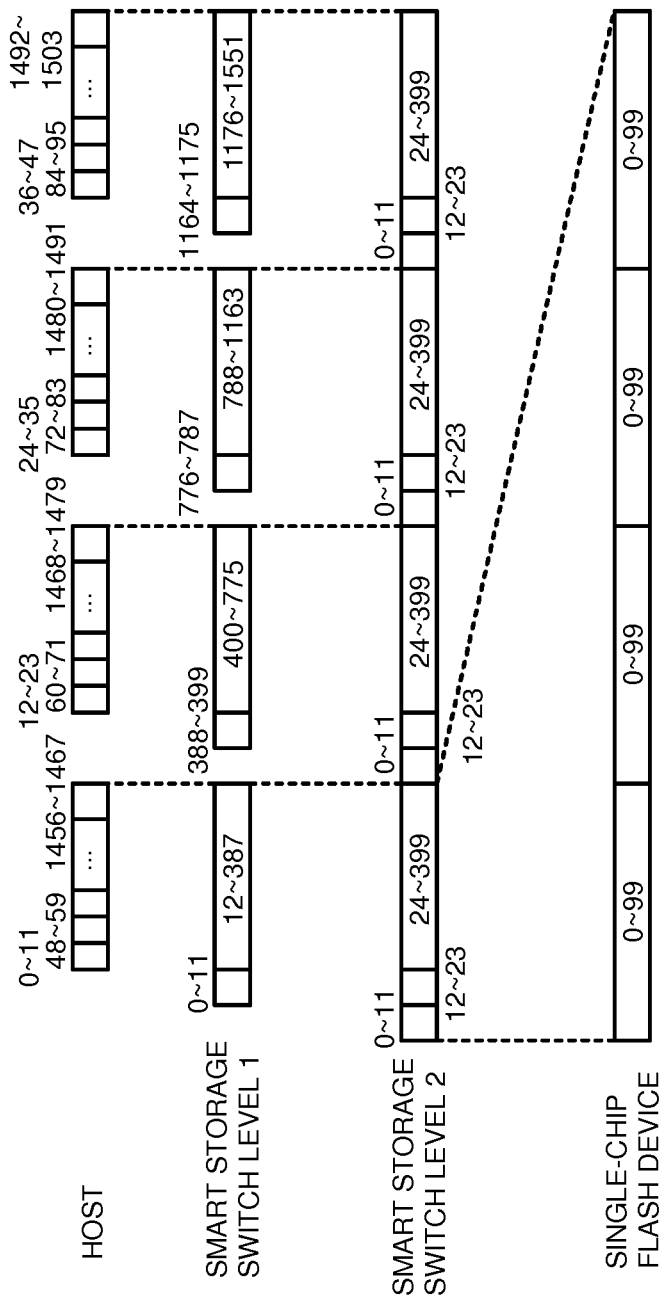
FIG. 7 highlights data striping using two levels of smart storage switches.

FIG. 7 highlights data striping using two levels of smart storage switches. Data stripes from the host are striped by two levels of smart storage switches and the SCFD. Each SCFD reserves some flash memory for overhead (OS image, system usage, bad blocks, reserved blocks, etc.) such as 28 of 128 total blocks (stripes), and reports the remaining capacity of 100 physical blocks up to the second-level smart storage switch. The overhead blocks may be used for wear-leveling and bad block maps within each SCFD that are used only by that SCFD, and not by higher levels of controllers, and for internal management code used by the SCFD. The second-level smart storage switch reserves 24 of the 400 blocks for its use, such as for mapping tables, device code, system data, OS image, etc.

In this example, there are 4 SCFD for each second-level smart storage switch 100, for a total of 400 blocks available. However, each second-level smart storage switch reserves 12 blocks for its overhead, such as for storing the maximum WLC and BBN reported by lower-level SCFD, and for internal code executed by the controller in the second-level smart storage switch. Thus the available blocks reported up to the top-level smart storage switch 102 is 400−12=388.

Each second-level smart storage switch 100 reports the remaining 388 blocks as its capacity up to the first-level smart storage switch 102. There are four second-level smart storage switches in this example, so there are 388×4=1552 blocks available. The first-level smart storage switch reserves 12 blocks from each downstream smart storage switch's capacity for its own top-level mapping tables, internal control and boot code, and other overhead. The first-level smart storage switch thus reports to the host that the total system capacity is 1552−12×4=1504 blocks.

Data from the host is striped by the first-level smart storage switch 102 so that the first 12 blocks are sent to the first of the second-level smart storage switches 100, the second 12 blocks are sent to the second of the second-level smart storage switches 100, the third 12 blocks are sent to the third of the second-level smart storage switches 100, and the fourth 12 blocks are sent to the fourth of the second-level smart storage switches 100. Stripes of 12 blocks each continue to be sent to the four second-level smart storage switches. This structure is like a RAID 0. It can be set up by a user. Each second-level smart storage switch 100 then divides its data up among the four downstream SCFD 10. This structure is the same as Just-a-Bunch-of-Disks (JBOD) mode. It can be any style for user to set it up.

When EEPROM 56 (FIG. 6) is available, the 12 overhead blocks can be allocated for host data. Other striping and interleaving schemes can be substituted, such as for JBOD mode, RAIDS, etc. Different striping schemes may be used for the first and second levels of the smart storage switches.

Figure 8:
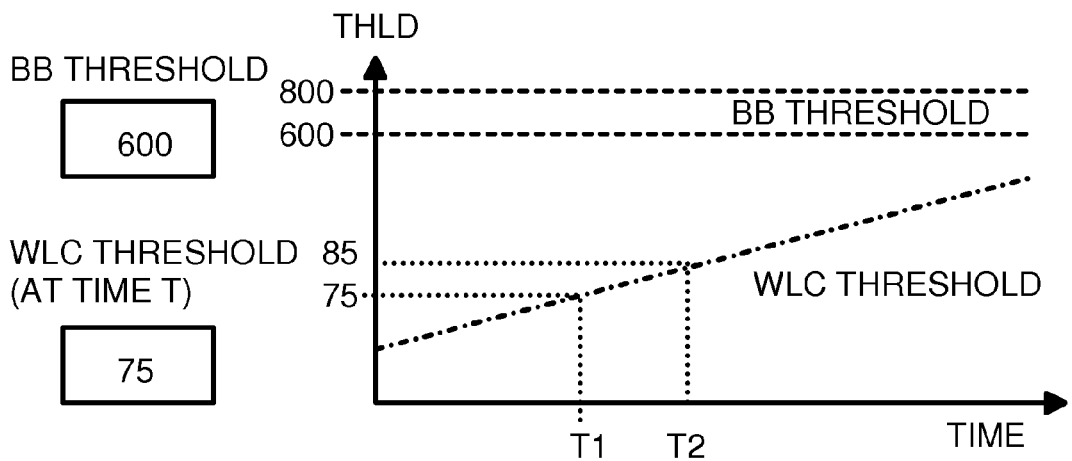
FIG. 8 shows the wear-leveling count threshold increasing over time.
Figure 9:
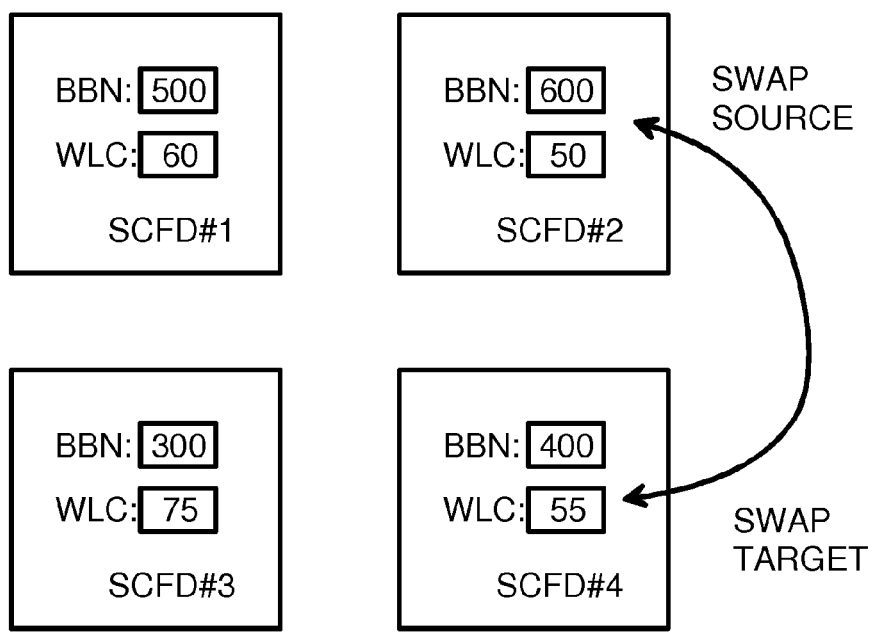
FIG. 9 highlights a WLC swap between SCFD's.

FIG. 8 shows the wear-leveling count threshold increasing over time. The BBN threshold is set to a fixed highest number specification that can be tolerated, such as 600. When a SCFD reaches the BBN threshold, the SCFD is considered to have failed, and no more data is stored in that SCFD. The data stored in that SCFD may be migrated to another SCFD. The WLC threshold is increased over time, such as each time that a WLC swap occurs. The WLC threshold is initially much smaller than the BBN threshold, but as the system ages, the WLC threshold becomes larger. For example, the WLC threshold is increased from 75 at time T1 to 85 at time T2. The BBN threshold may also be increased from 600 to 800 at time T2, FIG. 9 highlights a WLC swap between SCFD's. The smart storage switch has four downstream SCFD's, and compares each SCFD's maximum WLC to the WLC threshold. The maximum WLC is 75 from SCFD#3, which meets the WLC threshold of 75, so a WLC swap is triggered once one of the SCFD's maximum WLC reaches 75.

The source of the swap is the SCFD with the largest BBN, SCFD#2. The target of the swap is the SCFD with the lowest maximum WLC. However, since SCFD#2 has the highest BBN as well as the lowest WLC (50), it cannot be both the swap source and swap target. Instead, the SCFD with the next lowest WLC (55) is chosen, SCFD#4.

Figure 10A:
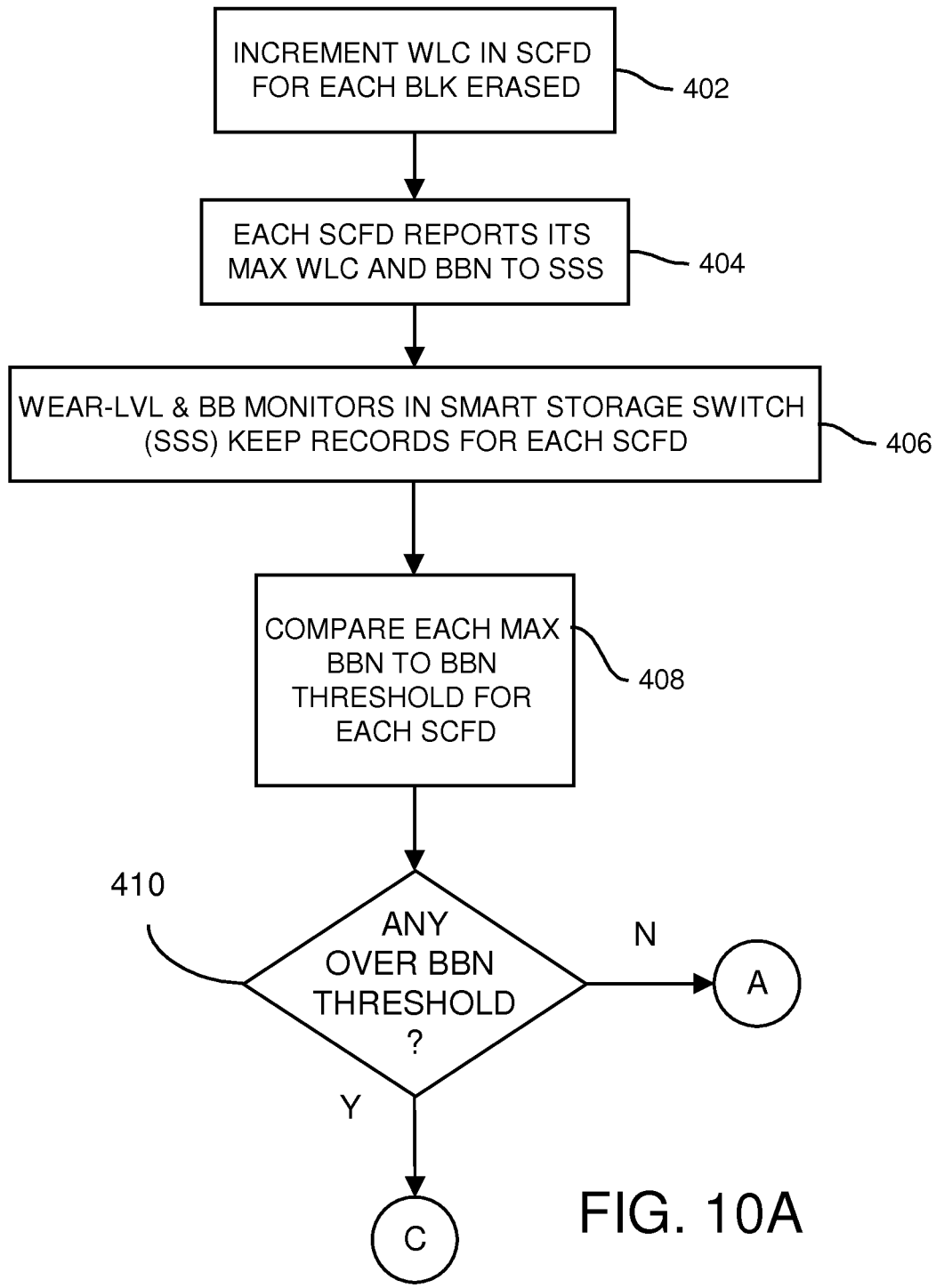
FIG. 10A-C is a flowchart of wear leveling and bad block management in the smart storage switch and SCFD's.
Figure 10B:
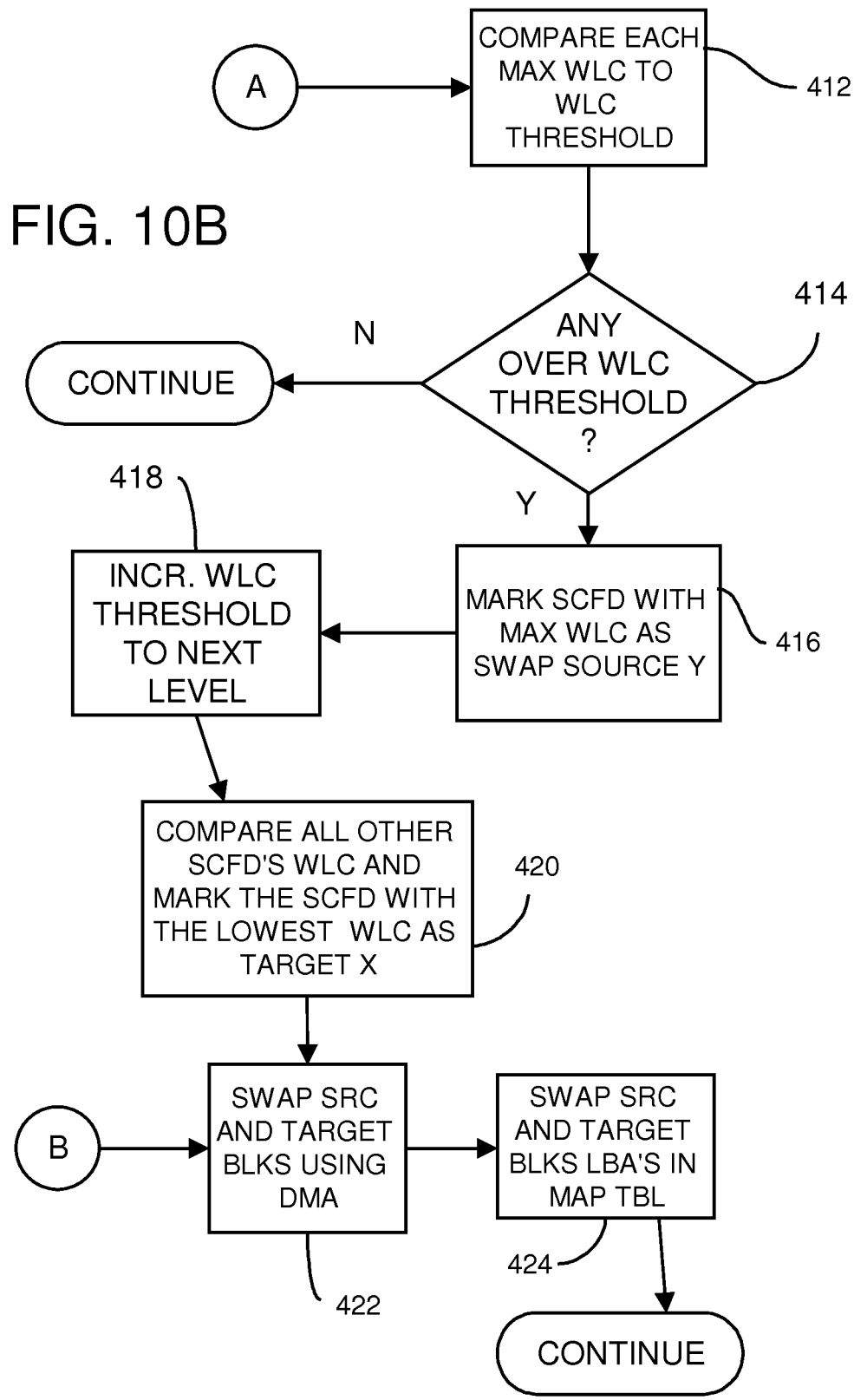
Figure 10C:
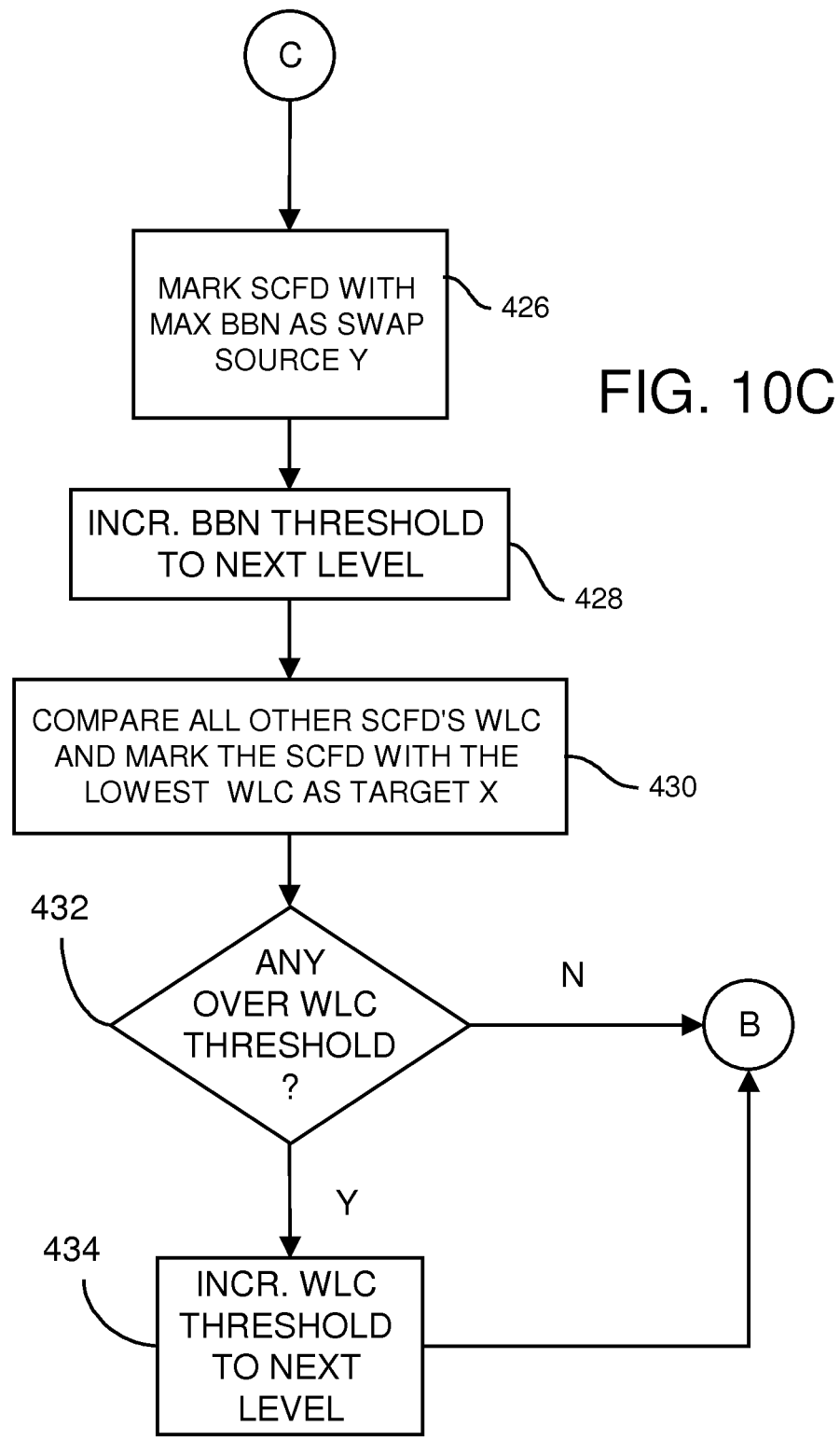

FIG. 10A-C is a flowchart of wear leveling and bad block management in the smart storage switch and SCFD's. Wear-leveling counts are kept in each SCFD for each physical block. A physical block's wear-leveling count (WLC) is incremented each time that block is erased, step 402. Each SCFD periodically reports its maximum wear-leveling count and the number of bad blocks (BBN) to the upstream smart storage switch, step 404. SCFD's could instead report their statistics to the smart storage switch in response to a poll or other event, rather than periodically. The wear-level and bad block monitors in the upstream smart storage switch record each SCFD's WLC and BBN, step 406.

The maximum BBN's for all downstream SCFD's are compared to the BBN threshold, step 408. If any of the maximum BBN's are over the BBN threshold, step 410, then the process continues on FIG. 10C. Otherwise, the process continues on FIG. 10B.

In FIG. 10C, the SCFD and its physical block with the largest of the maximum BBN's is marked as the swap source Y, step 426. The BBN threshold is increased to the next level, step 428.

The smart storage switch compares the maximum WLC's to find the overall minimum of the maximum WLC's, step 430. The SCFD with the physical block having the minimum of the maximum WLC's is selected as the target of the swap, X.

If any of the maximum WLC's are over the WLC threshold, step 432, then the WLC threshold in the smart storage switch is increased, step 434, so that a higher WLC is needed to trigger swapping in the future. The process continues in FIG. 10B, with the swap, step 422, The data in the physical blocks for the swap target X and swap source Y are exchanged using DMA, step 422.

Once the physical blocks of data have been swapped, the LBA's for these physical blocks are swapped in the mapping table in the smart storage switch, step 424. The process then continues from the beginning.

In FIG. 10A, when the BBN threshold was not reached, step 410, then the process continues in FIG. 10B.

In FIG. 10B, the maximum WLC's for all downstream SCFD's are compared to the WLC threshold, step 412. If none of the maximum WLC's are over the WLC threshold, step 414, then the process continues for another block, or idles for a period of time. If the WLC threshold is reached, then the SCFD and its physical block with the largest of the maximum WLC's is marked as the swap source Y, step 416. The WLC threshold is increased to the next level, step 418.

The smart storage switch compares the maximum WLC's to find the overall minimum of the maximum WLC's, step 420. The SCFD with the physical block having the minimum of the maximum WLC's is selected as the target of the swap, X.

The data in the physical blocks for the swap target X and swap source Y are exchanged using DMA, step 422.

Once the physical blocks of data have been swapped, the LBA's for these physical blocks are swapped in the mapping table in the smart storage switch, step 424. The process then continues from the beginning.

Figure 11:
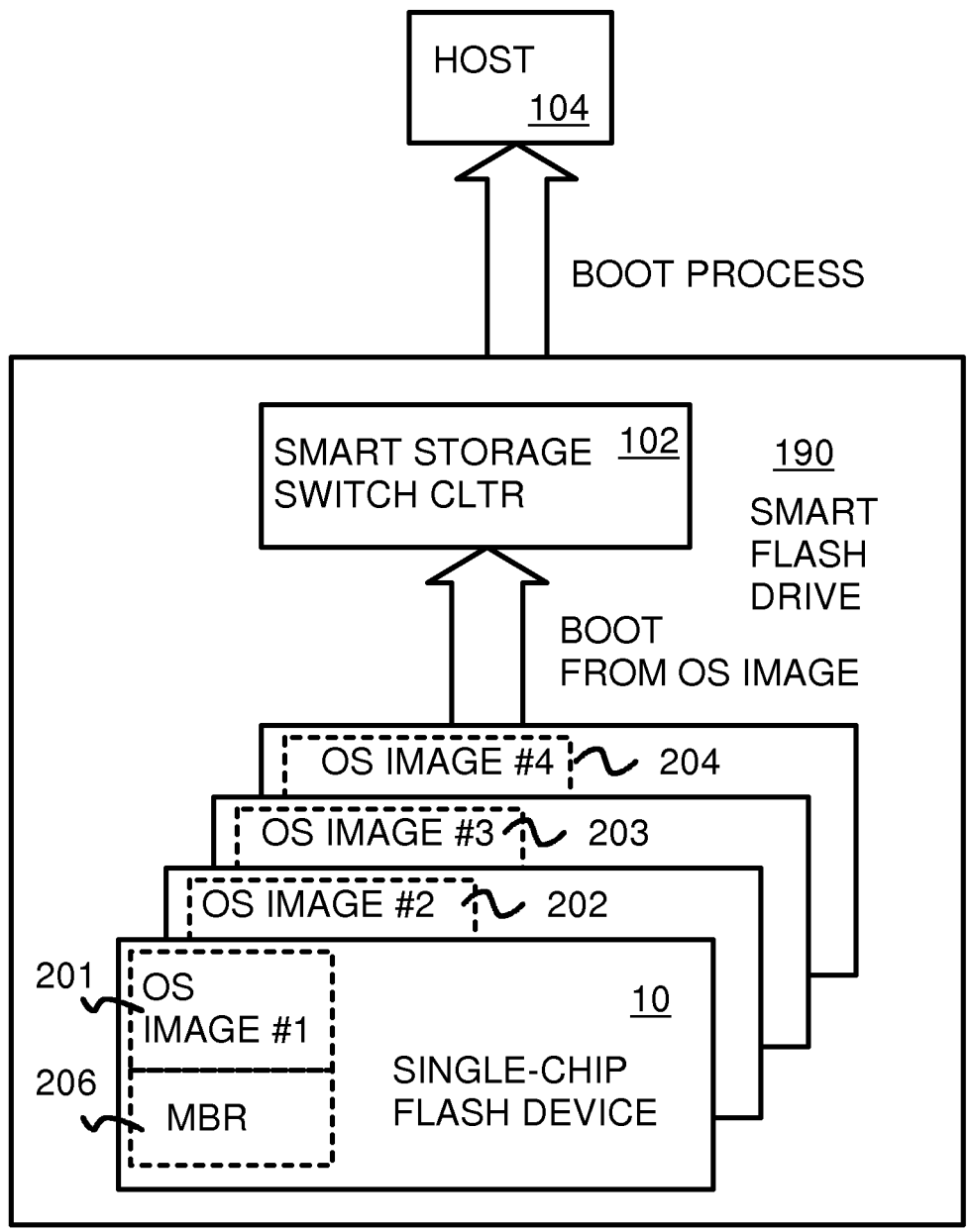
FIG. 11 shows a bootable smart flash drive.

FIG. 11 shows a bootable smart flash drive. Host 104 can boot from smart flash drive 190 by copying one or more of OS images 201, 202, 203, 204 to the RAM of host 104. Master Boot Record (MBR) 206 is used to help find out the locations of OS images. OS images 201-204 may be separate sequences of the same OS image that are loaded in a sequential order during the boot process. Redundant copies of the same OS image may also be stored on several different SCFD 10 that are accessed by smart storage switch controller 103 and sent over the host bus to host 104.

Figure 12:
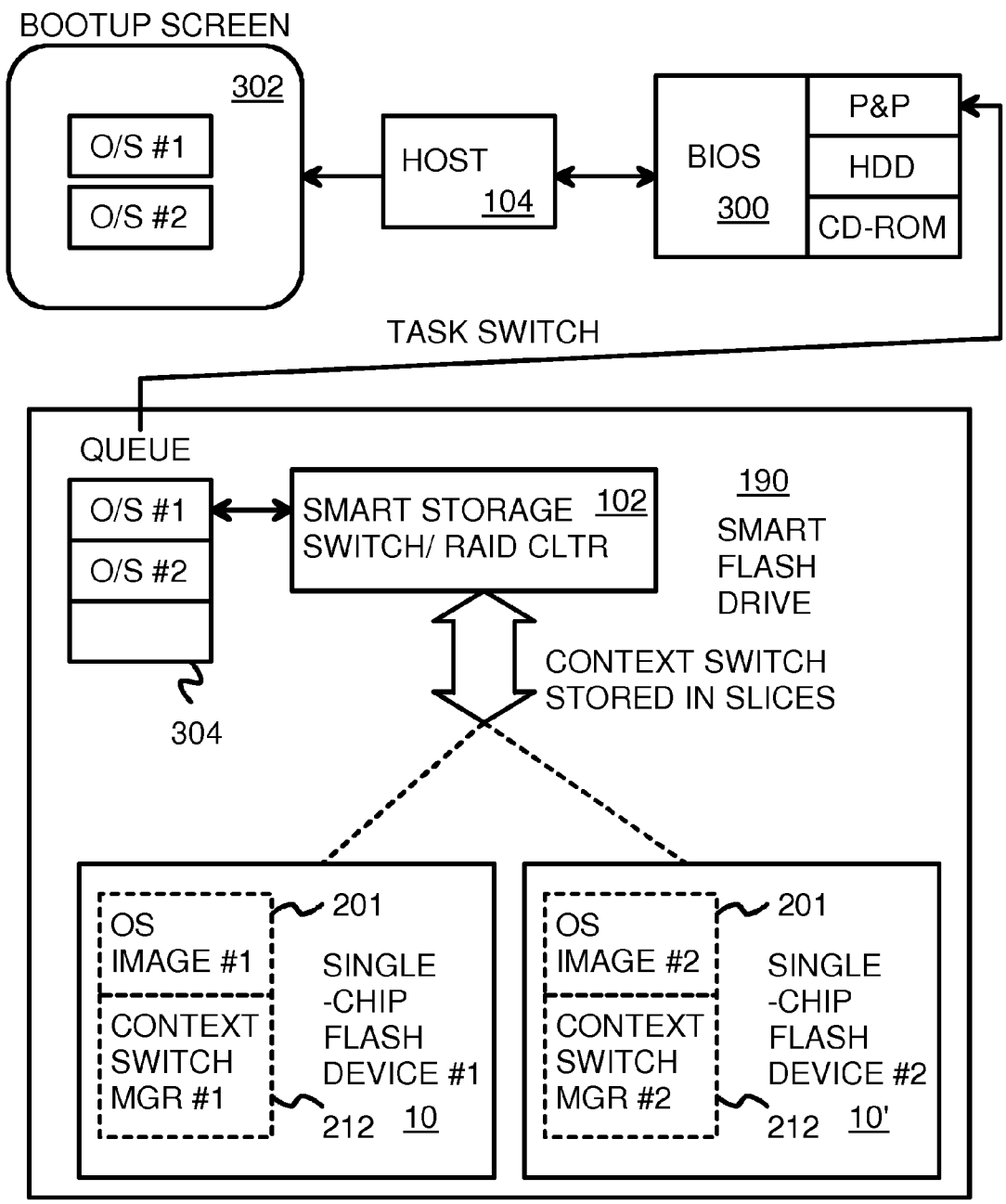
FIG. 12 shows multiple operating systems that are bootable from the smart flash drive.

FIG. 12 shows multiple operating systems that are bootable from the smart flash drive. The user of host 104 is presented with bootup screen 302 during initialization or power-up. The user can select to boot from either OS#1 or OS#2 by clicking on buttons or using a menu. OS#1 and OS#2 are separate operating systems, such as Windows, Linux, Chrome, etc.

BIOS 300 on host 104 can boot from a hard disk, CD-ROM, or a Plug-and-Play device such as smart flash drive 190. Queue 304 allows for fast task switching by storing code for both OS's. Smart storage switch controller 103 (such as one or more levels of smart storage switches) performs context switching among the OS's by reading OS images 201 and context switch managers 212 for the two different OS's stored in separate SCFD's 10, 10'.

Figure 13:
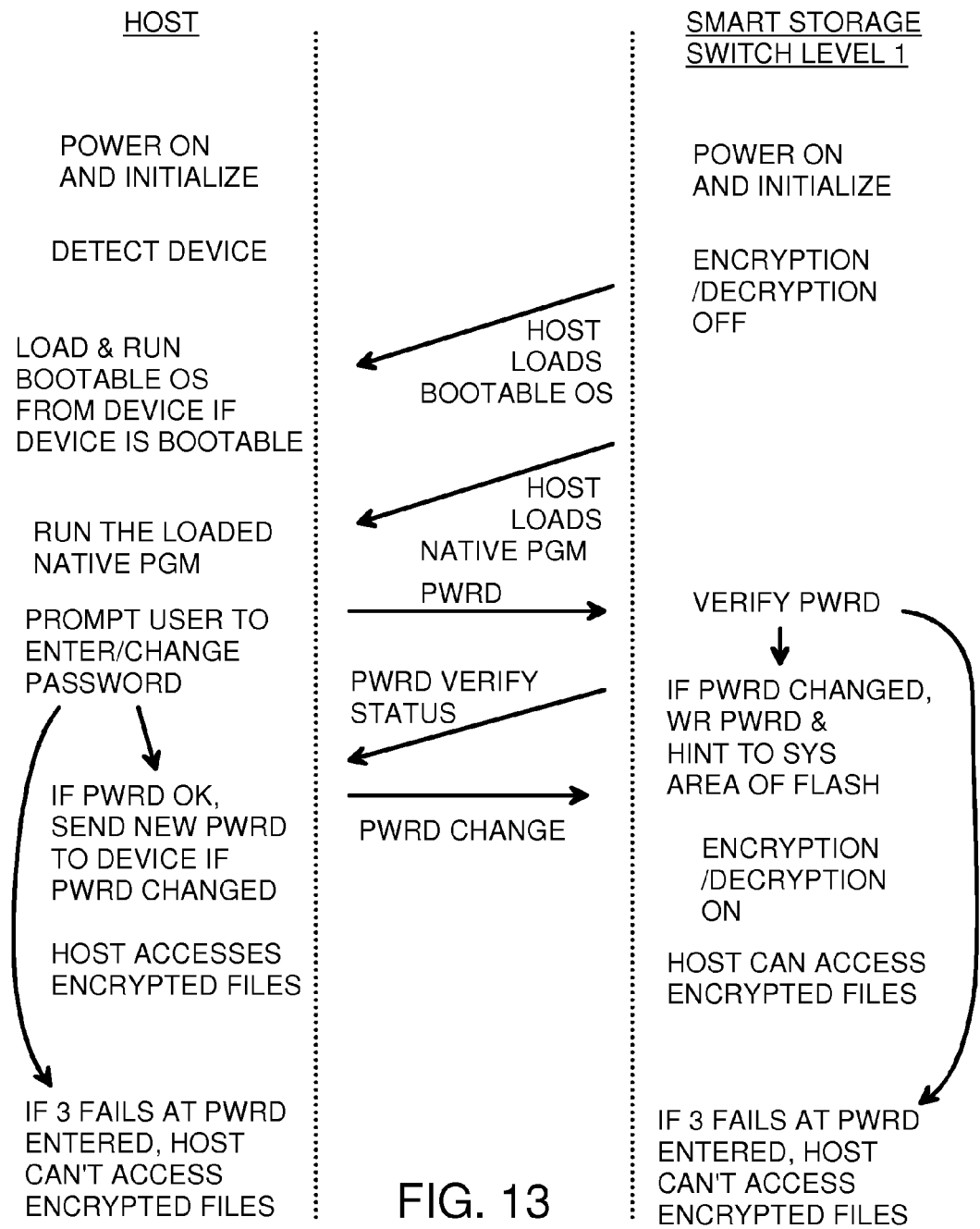
FIG. 13 illustrates a secure bootup process using a smart flash drive.

FIG. 13 illustrates a secure bootup process using a smart flash drive. The host and the top-level smart storage switch power on and initialize themselves. Encryption is initialized in the off or disabled mode. The host detects the smart storage switch and loads and executes the OS image or other bootable code from the smart storage device when the device is bootable.

The host also loads and runs a native program from the smart flash drive. This native program displays a prompt to the user to enter or change the password. The user enters the password and the host sends the password to the flash drive. The flash drive verifies the password by comparing it or a digest or compression of the key to a stored password or digest. The result of verification is reported back to the host. If the user fails to enter the correct password after three attempts, access to encrypted files is blocked.

The user can then change the password. If the new password entered by the user meets requirements such as the number and type of characters, the new password is sent to the smart flash drive. The smart flash drive writes the new password and any password hint to the flash memory.

The smart flash drive can then enable encryption of files. The smart flash drive can decrypt files being read, and encrypt files being written to flash, and send clear text files back to the host.

Figure 14:
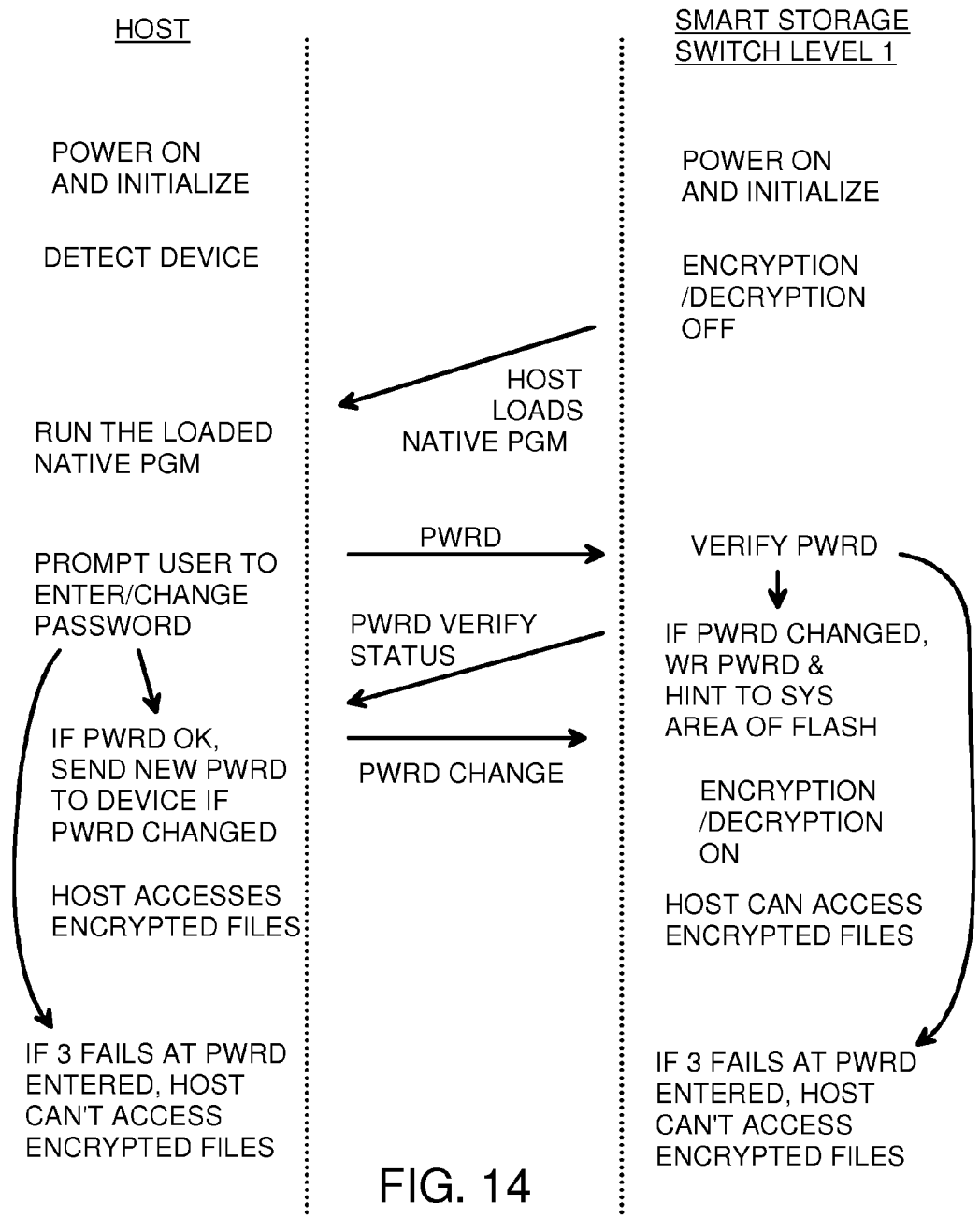
FIG. 14 illustrates a secure file-access process using a smart flash drive.

FIG. 14 illustrates a secure file-access process using a smart flash drive. The host and the top-level smart storage switch power on and initialize themselves. Encryption is initialized in the off or disabled mode. The host detects the smart storage switch and loads and executes a native program from the smart flash drive. This native program displays a prompt to the user to enter or change the password. The user enters the password and the host sends the password to the flash drive. The flash drive verifies the password by comparing it or a digest or compression of the key to a stored password or digest. The result of verification is reported back to the host. If the user fails to enter the correct password after three attempts, access to encrypted files is blocked.

The user can then change the password. If the new password entered by the user meets requirements such as the number and type of characters, the new password is sent to the smart flash drive. The smart flash drive writes the new password and any password hint to the flash memory. The smart flash drive can then enable encryption of files. The smart flash drive can decrypt files being read, and encrypt files being written to flash, and send clear text files back to the host.

Figure 15:
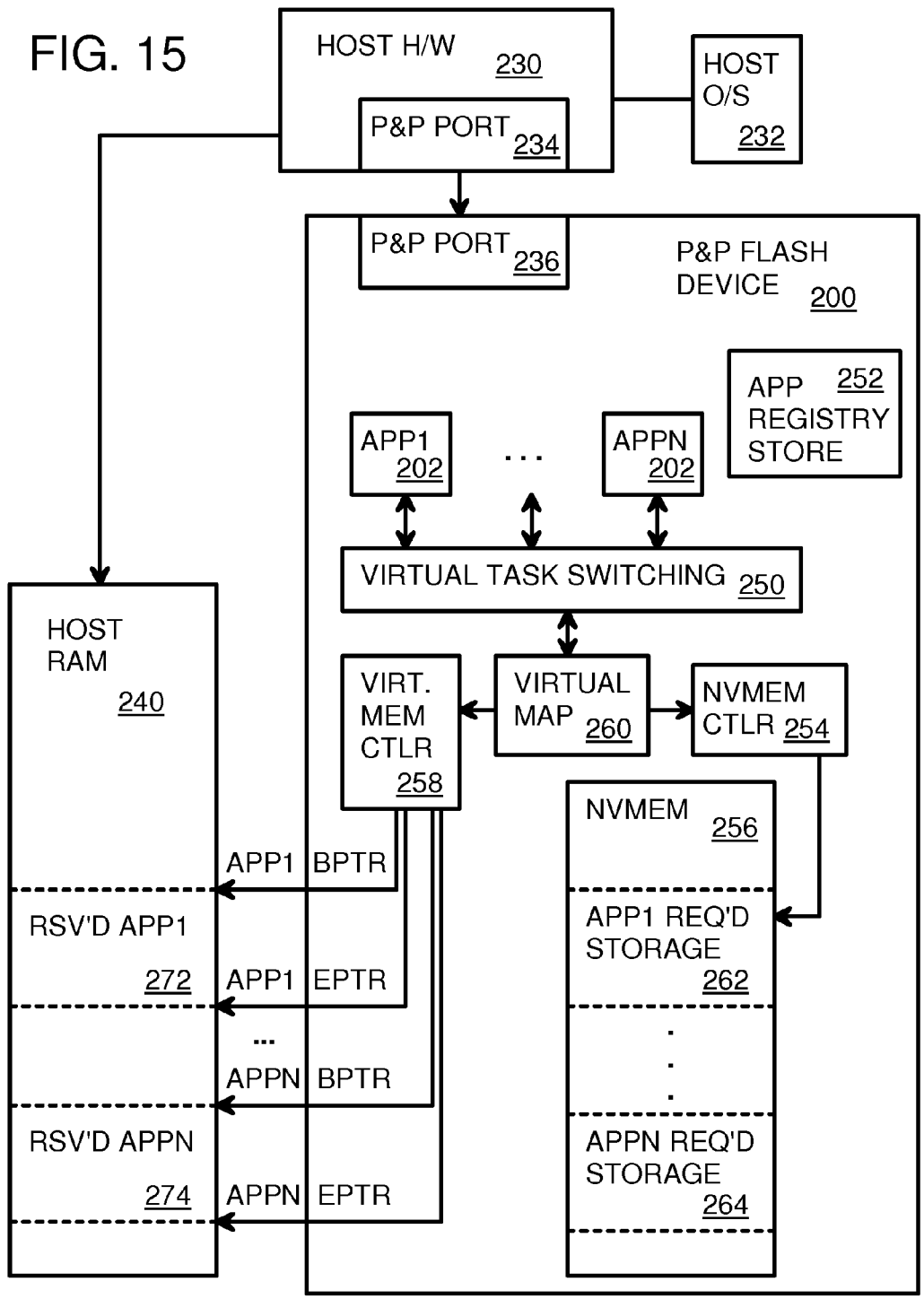
FIG. 15 illustrates task switching among multiple application programs in a smart flash drive.

FIG. 15 illustrates task switching among multiple application programs in a smart flash drive. Host OS 232 runs on host 230 and accesses host RAM 240. Plug-and-play port 234 in host 230 connects to plug-and-play port 236 in plug-and-play flash device 200, which can include one or more levels of smart storage switches and SCFD. Non-volatile memory NVMEM 256 is spread across one or more SCFD and accessed through the smart storage switches. FIG. 15 shows the conceptual view of application switching rather than the physical view.

Application registry store 252 stores registry and other parameters for each of applications 202. Virtual task switching 250 rapidly switches execution among applications 202. Virtual map 260 maps logical memory locations accessed by applications 202 to either virtual or NV memory. NV memory controller 254 accesses application 1 required storage 262 in NVMEM 256 when application 1 is executing, NV memory controller 254 accesses application N's required storage 264 in NVMEM 256 when application N is executing, Applications 202 can also access virtual memory that is physically stored in host RAM 240. Virtual memory controller 258 has beginning and ending pointers to reserved application areas 272, 274 in host RAM 240. Thus applications can access both flash memory on the smart flash drive and host memory.

Plug and play flash device 200 has already installed OS-recognizable application programs 202 (1 to N) at storage 262, 264 of NVMEM 256. The related environment parameters of the application programs are stored in application registry store 252. Once Plug and play flash device 200 is plugged into the hardware of host 230, a pop-up window will display on the monitor of the host and show icons of each application program. The user executes the application program 1 by double clicking on the icon of application program 1. The OS then loads application program 1 262 from NVMEM 256 and its environment parameters from application registry store 252 to host RAM 240. The OS then executes the application program from host RAM 240

Figure 16:
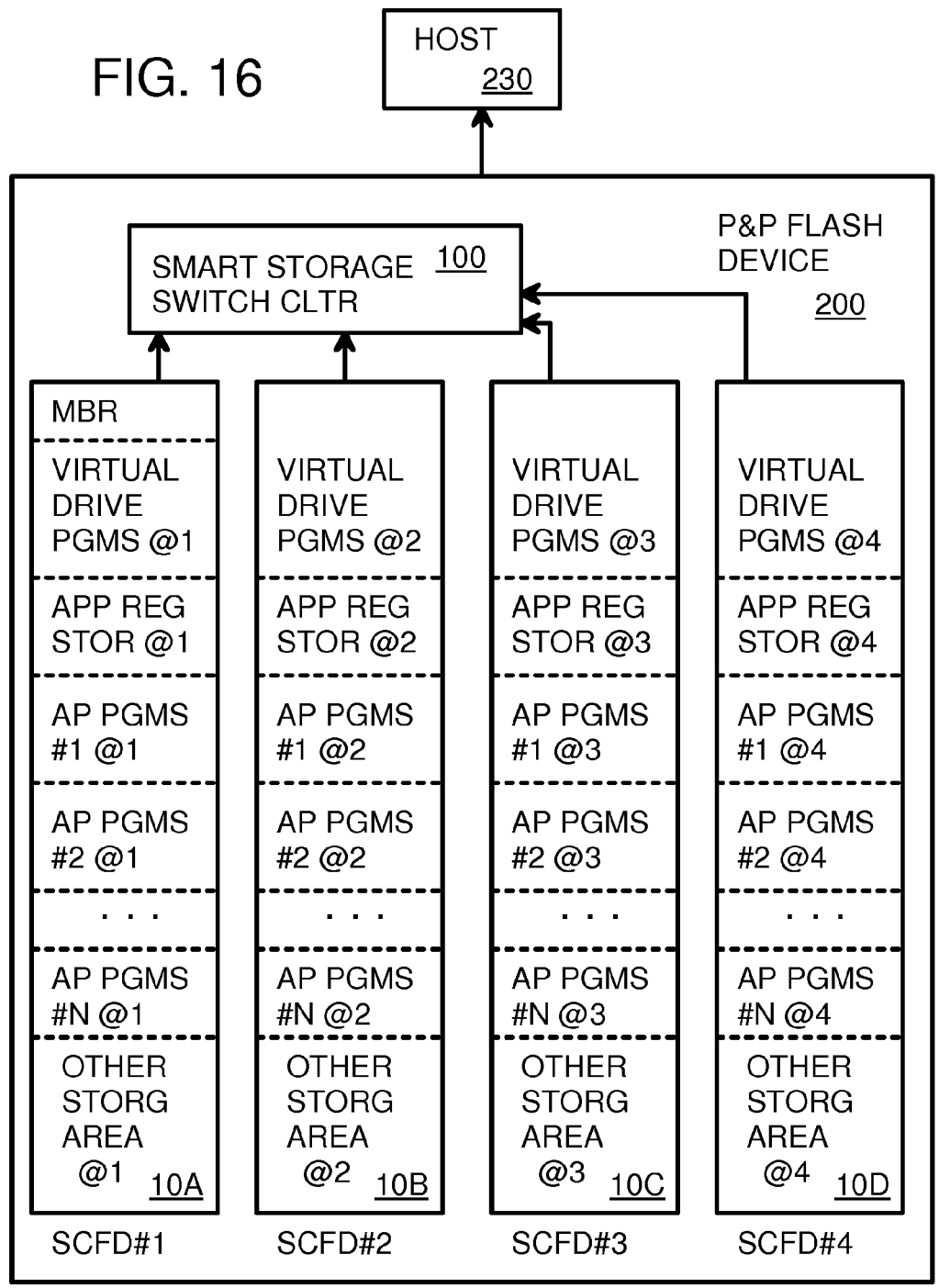
FIG. 16 shows striping of multiple applications across multiple SCFD.

FIG. 16 shows striping of multiple applications across multiple SCFD. Host 230 loads and executes virtual drive programs when plug-and-play flash device 200 is plugged into the host. The user then selects and executes various application programs stored on plug-and-play flash device 200.

Smart storage switch 100 includes one, two, or more levels of smart storage switches and accesses flash memory of SCFD 10A-10D. Application program #1 is stored across all four SCFD 10A-10D. Likewise, other application programs #2, . . . #N are stores across all four SCFD 10A-10D. The four SCFD 10A-10D also have other storage areas as well as application register storage and virtual drive programs that are striped across all four SCFD. The master Boot Record (MBR) is stored in the first SCFD.

Figure 17:
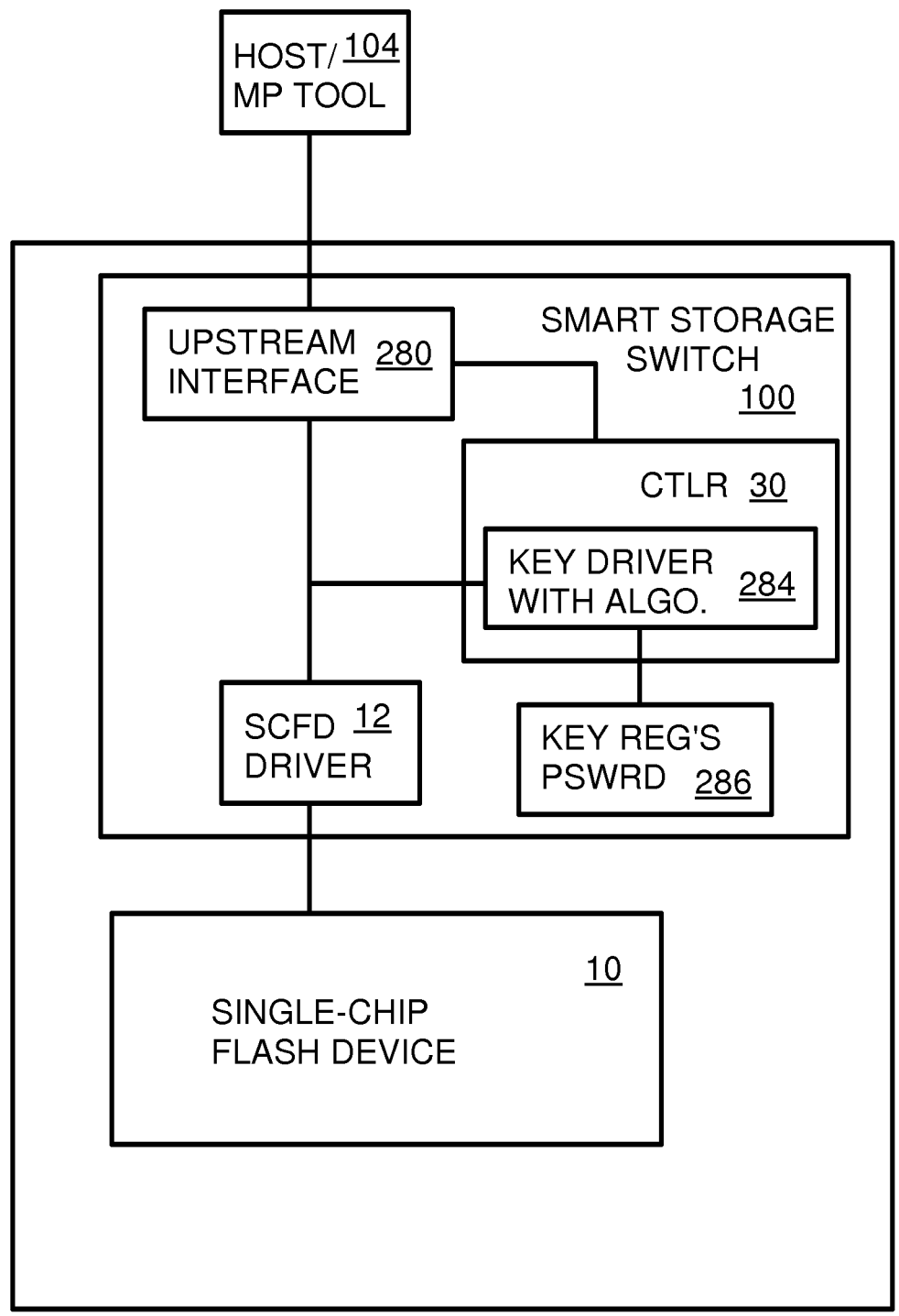
FIG. 17 is a block diagram of a smart flash drive with password and multi-key verification to enable applications.

FIG. 17 is a block diagram of a smart flash drive with password verification to enable applications. Host 104 or a manufacturing or production tool communicates with smart storage switch 100 through upstream interface 280. Controller 30 includes or executes key driver 284 which implements encryption algorithms. Passwords and keys are stored in key register 286 and accessed by key driver 284. When a large number of keys are stored by key register 286, some or all of the keys can be stored in a reserved area of flash memory in SCFD 10.

Figure 18:
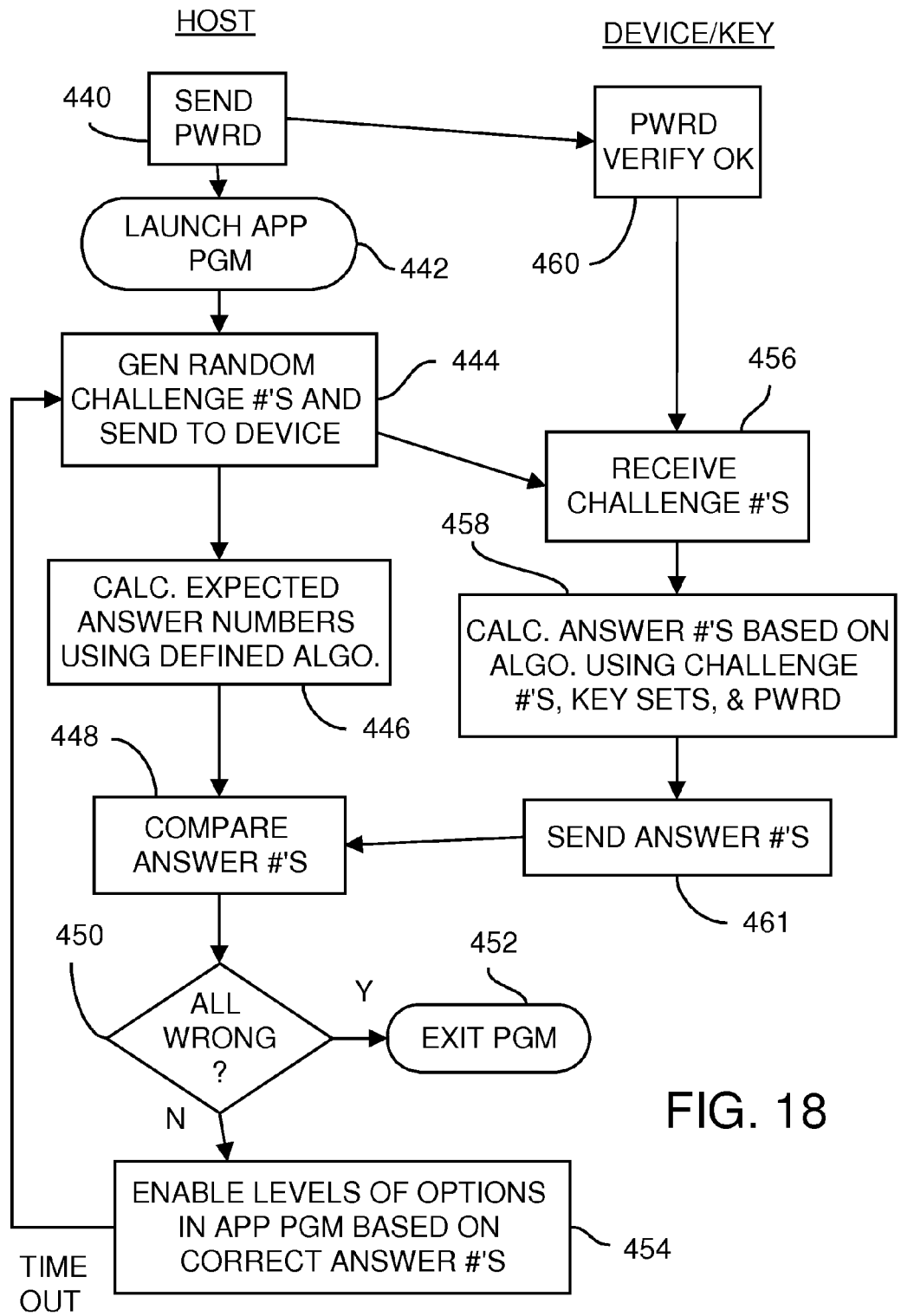
FIG. 18 is a flowchart of password and multi-key verification using a smart flash drive.

FIG. 18 is a flowchart of program-execution verification using a smart flash drive of FIG. 17. The user enters a password on the host, step 440, which is sent over the host interface to the smart flash drive or smart flash device. The smart flash device acts as a security key. The controller on the smart flash device executes encryption and verification routines to verify the password against stored passwords that are stored on the smart flash drive and sends a pass/fail status back to the host, step 460.

An application is launched and begins executing on the host, step 442. The application generates a group of random challenge numbers that are sent to the smart flash device, step 444. The smart flash device's firmware receives these challenge numbers from the host, step 456, together with the keys preinstalled, and the password entered at step 440 as inputs, and uses a security algorithm to generate a group of answer numbers. The smart flash device sends the answer numbers to the host, step 461.

The host generates a group of expected answer numbers using the same security algorithm and the challenge numbers together with the keys preinstalled in the application program, and the password entered at step 440 as inputs, step 446, and compares the expected answer numbers to the answer numbers received from the smart flash device, step 448. When all the answer numbers mismatch, step 450, the program running on the host is exited, step 452. This prevents the user from executing the program.

When all of the answer numbers match, the user is enabled for all levels of the program. When some but not all answer numbers match, the user is enabled for some levels of the program but disabled for other levels of the program, step 454. For example, the user may be enabled for read-only access, for modify access, or for administrator access levels. Different versions, such as home, office, pro, trial, etc. can correspond to different key sets in key register 286 to enable a predetermined version for execution by the user. After a timeout another set of random challenge numbers are generated by the host and the routine repeats from step 444.

Alternate Embodiments

Several other embodiments are contemplated by the inventors. Rather than store copies of the user password, a digest of the password could be stored, or a complement such as for a public-private key pair.

SCFD 10 can include one of the following: a block mode mapper with hybrid SLC/MLC flash memory, a block mode mapper with SLC or MLC, a page mode mapper with hybrid MLC/SLC flash memory, a page mode mapper with SLC or MLC. SCFD 10 can include raw flash memory die or blocks.

Each block may be divided into multi-page zones. For example, a block may have 16 pages and 4 zones, with 4 pages per zone. Some of the mapping may be for zones rather than for individual pages in this alternative embodiment. Alternatively, in a special case, there can be one page per zone. Fewer mapping entries are needed with zone-mode than for page-mode, since each zone is multiple pages.

The upper bits of the logical-sector address (LSA) from the host may select a cluster or district. All of the entries in a mapping table may be for the same district. When the district number from the LSA matches the district number of all the entries in the mapping table, the LBA from the LSA selects an entry in the mapping table. Hybrid or multi-level mapping tables may also be used.

Copying of blocks for relocation is less frequent with page mapping since the sequential-writing rules of the non-SLC flash are violated less often in page mode than in block mode. This increases the endurance of the flash system and increases performance.

The mapping tables may be located in an extended address space, and may use virtual addresses or illegal addresses that are greater than the largest address in a user address space.

Pages may remain in the host's page order or may be remapped to any page location. Other encodings are possible.

Many variations of the block diagrams are possible. A ROM such as an EEPROM could be connected to or part of a controller and be dedicated to storing firmware for a virtual storage processor. This firmware could also be stored in the main flash modules. The Host interface bus can be a Serial AT-Attachment (SATA) bus, a Peripheral Components Interconnect Express (PCIe) bus, a compact flash (CF) bus, or a Universal-Serial-Bus (USB), a Firewire 1394 bus, a Fibre Channel (FC) bus, etc. LBA storage bus interface 28 can be a Serial AT-Attachment (SATA) bus, an integrated device electronics (IDE) bus, a Peripheral Components Interconnect Express (PCIe) bus, a compact flash (CF) bus, a Universal-Serial-Bus (USB), a Secure Digital (SD) bus, a Multi-Media Card (MMC) bus, a Firewire 1394 bus, a Fibre Channel (FC) bus, various Ethernet buses, etc. SCFD can include SLC or MLC flash only or can be combined SLC/MLC flash. A low-level mapper in SCFD 10 can perform one level of block/zone/page mapping to a portion of SLC or MLC flash memory, and two levels of page mapping may be performed for the remaining SLC or MLC flash memory.

The flash memory may be embedded on a motherboard or SSD board or could be on separate modules. Capacitors, buffers, resistors, and other components may be added. Smart storage switch 100 may be integrated on the motherboard or on a separate board or module. SCFD 76 can be integrated with smart storage switch 100 or with raw-NAND flash memory chips as a single-chip device or a plug-in module or board.

Using multiple levels of controllers, such as in a president-governor arrangement of controllers, the controllers in smart storage switch 100 may be less complex than would be required for a single level of control for wear-leveling, bad-block management, re-mapping, caching, power management, etc. Since lower-level functions are performed among SCFD 10 as a governor function, the president function in smart storage switch 100 can be simplified. Less expensive hardware may be used in smart storage switch 100, such as using an 8051 processor for a controller or a virtual storage processor or a smart storage transaction manager, rather than a more expensive processor core such as a an Advanced RISC Machine ARM-9 CPU core.

Different numbers and arrangements of flash storage blocks can connect to the smart storage switch. Rather than use a LBA storage bus interface or differential serial packet buses, other serial buses such as synchronous Double-Data-Rate (DDR), ONFI, Toggle NAND, a differential serial packet data bus, a legacy flash interface, etc.

Mode logic could sense the state of a pin only at power-on rather than sense the state of a dedicated pin. A certain combination or sequence of states of pins could be used to initiate a mode change, or an internal register such as a configuration register could set the mode. A multi-bus-protocol chip could have an additional personality pin to select which serial-bus interface to use, or could have programmable registers that set the mode to hub or switch mode.

The transaction manager, controllers, and functions can be implemented in a variety of ways. Functions can be programmed and executed by a CPU or other processor, or can be implemented in dedicated hardware, firmware, or in some combination. Many partitionings of the functions can be substituted. Smart storage switch 100 may be hardware, or may include firmware or software or combinations thereof.

Overall system reliability is greatly improved by employing Parity/ECC with multiple SCFD 10, and distributing data segments into a plurality of NVM blocks. However, it may require the usage of a CPU engine with a DDR/SDRAM cache in order to meet the computing power requirement of the complex ECC/Parity calculation and generation. Another benefit is that, even if one flash block or flash module is damaged, data may be recoverable, or the smart storage switch can initiate a "Fault Recovery" or "Auto-Rebuild" process to insert a new flash module, and to recover or to rebuild the "Lost" or "Damaged" data. The overall system fault tolerance is significantly improved.

Wider or narrower data buses and flash-memory chips could be substituted, such as with 16 or 32-bit data channels. Alternate bus architectures with nested or segmented buses could be used internal or external to the smart storage switch. Two or more internal buses can be used in the smart storage switch to increase throughput. More complex switch fabrics can be substituted for the internal or external bus.

Data striping can be done in a variety of ways, as can parity and error-correction code (ECC). Packet re-ordering can be adjusted depending on the data arrangement used to prevent re-ordering for overlapping memory locations. The smart switch can be integrated with other components or can be a stand-alone chip.

Additional pipeline or temporary buffers and FIFO's could be added. For example, a host FIFO in smart storage switch 100 may be part of controller 30, or may be stored in buffer RAM. Separate page buffers could be provided in each channel. A clock source could be added.

A single package, a single chip, or a multi-chip package may contain one or more of the plurality of channels of flash memory and/or the smart storage switch. The invention is not limited to the usage of SCFD. SCFD can be replace with any kind of nonvolatile device with nonvolatile flash memory and a controller.

A MLC-based flash module may have four MLC flash chips with two parallel data channels, but different combinations may be used to form other flash modules, for example, four, eight or more data channels, or eight, sixteen or more MLC chips. The flash modules and channels may be in chains, branches, or arrays. For example, a branch of 4 flash modules could connect as a chain to smart storage switch 100. Other size aggregation or partition schemes may be used for different access of the memory. Flash memory, a phase-change memory (PCM), or ferroelectric random-access memory (FRAM), Magnetoresistive RAM (MRAM), Memristor, PRAM, SONOS, Resistive RAM (RRAM), Racetrack memory, and nano RAM (NRAM) may be used.

The host can be a PC motherboard or other PC platform, a mobile communication device, a personal digital assistant (PDA), a digital camera, a production tool or tester, a combination device, or other device. The host bus or host-device interface can be SATA, PCIE, SD, USB, or other host bus, while the internal bus to a flash module can be PATA, multi-channel SSD using multiple SD/MMC, compact flash (CF), USB, or other interfaces in parallel. A flash module could be a standard PCB or may be a multi-chip modules packaged in a TSOP, BGA, LGA, COB, PIP, SIP, CSP, POP, or Multi-Chip-Package (MCP) packages and may include raw-NAND flash memory chips or raw-NAND flash memory chips may be in separate flash chips, or other kinds of NVM flash memory. The internal bus may be fully or partially shared or may be separate buses. The SSD system may use a circuit board with other components such as LED indicators, capacitors, resistors, etc. Power management may be added at one or more levels.

Directional terms such as upper, lower, up, down, top, bottom, etc. are relative and changeable as the system or data is rotated, flipped over, etc. These terms are useful for describing the device but are not intended to be absolutes.

NVM flash memory may be on a flash module that may have a packaged controller and flash die in a single chip package that can be integrated either onto a PCBA, or directly onto the motherboard to further simplify the assembly, lower the manufacturing cost and reduce the overall thickness. Flash chips could also be used with other embodiments including the open frame cards.

Rather than use smart storage switch 100 only for flash-memory storage, additional features may be added. For example, a music player may include a controller for playing audio from MP3 data stored in the flash memory. An audio jack may be added to the device to allow a user to plug in headphones to listen to the music. A wireless transmitter such as a BlueTooth transmitter may be added to the device to connect to wireless headphones rather than using the audio jack. Infrared transmitters such as for IrDA may also be added. A BlueTooth transceiver to a wireless mouse, PDA, keyboard, printer, digital camera, MP3 player, or other wireless device may also be added. The BlueTooth transceiver could replace the connector as the primary connector. A BlueTooth adapter device could have a connector, a RF (Radio Frequency) transceiver, a baseband controller, an antenna, a flash memory (EEPROM), a voltage regulator, a crystal, a LED (Light Emitted Diode), resistors, capacitors and inductors. These components may be mounted on the PCB before being enclosed into a plastic or metallic enclosure.

The background of the invention section may contain background information about the problem or environment of the invention rather than describe prior art by others. Thus inclusion of material in the background section is not an admission of prior art by the Applicant.

Any methods or processes described herein are machine-implemented or computer-implemented and are intended to be performed by machine, computer, or other device and are not intended to be performed solely by humans without such machine assistance. Tangible results generated may include reports or other machine-generated displays on display devices such as computer monitors, projection devices, audio-generating devices, and related media devices, and may include hardcopy printouts that are also machine-generated. Computer control of other machines is another tangible result.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claim elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A smart flash drive comprising:
a top-level smart storage switch that is connected upstream to a host and has a plurality of downstream interfaces;
a plurality of second-level smart storage switches each having an upstream interface to the top-level smart storage switch and a plurality of downstream interfaces;
an operation unit, in a data path of the top-level smart storage switch, for performing an operation upon data to be stored in a physical block of flash memory, wherein the operation is a compression or an encryption;
a plurality of single-chip flash devices (SCFD's), a SCFD comprising:
a plurality of physical blocks of flash memory;
a low-level wear-level controller that performs wear-leveling swapping of physical blocks within that SCFD based on a wear-level count (WLC) for each physical block;
a low-level mapper that maps a low-level logical address to a physical-block address (PBA) for physical blocks within the SCFD;
a top-level Redundant Array of Individual Disks (RAID) controller, in the top-level smart storage switch, the top-level RAID controller striping host data into a plurality of top-level stripes to the plurality of second-level smart storage switches
a plurality of second-level RAID controllers in the plurality of second-level smart storage switches, wherein a second-level RAID controller stripes data received on the upstream interface of a second-level smart storage switch into a plurality of second-level stripes to the plurality of SCFD connected to the second-level smart storage switch; and
an interleaving controller, in the SCFD, for interleaving data received by the SCFD across multiple planes of flash memory.

2. The smart flash drive of claim 1 wherein the top-level smart storage switch reserves a first reserved area of the plurality of physical blocks of flash memory in the a plurality of SCFD's, the first reserved area for storing overhead management information used by the top-level smart storage switch, the first reserved area not reported to the host as available memory;
wherein a second-level smart storage switch reserves a second reserved area of the plurality of physical blocks of flash memory in the a plurality of SCFD's, the second reserved area for storing overhead management information used by the second-level smart storage switch, the second reserved area not reported to the top-level smart storage switch as available memory;
wherein the SCFD reserves a third reserved area of the plurality of physical blocks of flash memory in the a plurality of SCFD's, the third reserved area for storing overhead management information used by the SCFD, the third reserved area not reported to the second-level smart storage switch as available memory,
whereby three levels of reserved areas are stored in the SCFD for use by three levels of controllers.

3. The smart flash drive of claim 2 wherein a channel size is a size of a physical block of flash memory multiplied by a number of planes interleaved by the interleaving controller;
wherein a top-level stripe size is a number of SCFD connected to the second-level smart storage switch.

4. The smart flash drive of claim 3 wherein the SCFD further comprises:
  a low-level wear-level controller that performs wear-leveling swapping of physical blocks within that SCFD based on a wear-level count (WLC) for the physical block;
  a bad-block manager that disables and counts bad blocks within the SCFD to generate a bad-block number (BBN) for the SCFD.

5. The smart flash drive of claim 4 wherein the SCFD reports a maximum WLC and a BBN to an upstream second-level smart storage switch;
  wherein the second-level smart storage switch further comprises:
  a structure register that stores the maximum WLC and the BBN for all SCFD connected to the second-level smart storage switch.

6. The smart flash drive of claim 5 wherein the top-level smart storage switch further comprises:
  a top-level structure register that stores the maximum WLC and a maximum BBN reported by the second-level smart storage switch connected to the top-level smart storage switch.

7. The smart flash drive of claim 6 wherein the second-level smart storage switch further comprises:
  a mid-level wear leveler, reading the maximum WLC and BBN from the structure register, and comparing the maximum WLC to a WLC threshold to activate a wear-leveling swap when one of the maximum WLC stored in the structure register exceeds the WLC threshold; and
  a direct-memory access (DMA) engine that is programmed to swap data from a source physical block in a target SCFD that has a BBN that is a largest BBN stored in the structure register, the DMA engine swapping data to a target physical block in a source SCFD that has a maximum WLC that is lower than other maximum WLC stored in the structure register;
whereby physical blocks of flash memory in the SCFD are wear-leveled by the second-level smart storage switch that examines maximum WLC and BBN stored in the structure register.

8. A smart flash device comprising:
  a plurality of single-chip flash devices (SCFD's), a SCFD comprising:
    a plurality of physical blocks of flash memory;
    a low-level wear-level controller that performs wear-leveling swapping of physical blocks within that SCFD based on a wear-level count (WLC) for the physical block;
    a low-level mapper that maps a low-level logical address to a physical-block address (PBA) for physical blocks within the SCFD;
    a bad-block manager that disables and counts bad blocks within the SCFD to generate a bad-block number (BBN) for the SCFD;
    wherein the SCFD generates a maximum WLC from the WLC for physical blocks in the SCFD and reports over an upstream interface the maximum WLC and the BBN;
  a low-level smart storage switch that comprises:
    a plurality of SCFD drivers, a SCFD driver for connecting to a SCFD in the plurality of SCFD;
    an upstream interface that receives data from an upstream device;
    a controller that stripes the data from the upstream device among the plurality of SCFD, wherein a stripe size is equal to a channel size of the SCFD;
    a structure register that stores the maximum WLC and the BBN for the plurality of SCFD connected to the low-level smart storage switch;
    a mid-level wear leveler, reading the maximum WLC and BBN from the structure register, having a comparator that compares the maximum WLC to a WLC threshold and activates a wear-leveling swap when one of the maximum WLC stored in the structure register exceeds the WLC threshold; and
    a direct-memory access (DMA) engine that is programmed to swap data from a source physical block in a target SCFD that has a BBN that is a largest BBN stored in the structure register, the DMA engine swapping data to a target physical block in a source SCFD that has a maximum WLC that is lower than other maximum WLC stored in the structure register,
whereby physical blocks of flash memory in the SCFD are wear-leveled by the low-level smart storage switch that examines maximum WLC and BBN stored in the structure register.

9. The smart flash device of claim 8 further comprising:
  a plurality of the low-level smart storage switches that connect to a top-level smart storage switch;
  wherein a low-level smart storage switch generates a maximum WLC and a maximum BBN stored in its structure register and reports to the top-level smart storage switch the maximum WLC and the maximum BBN;
  wherein the top-level smart storage switch comprises:
    an upstream interface that receives data from a host;
    a top-level controller that stripes the data from the host among the plurality of low-level smart storage switches, wherein a top-level stripe size is equal to the channel size of the SCFD multiplied by a number of SCFD connected to the low-level smart storage switch;
    a top-level structure register that stores the maximum WLC and the maximum BBN for the low-level smart storage switches connected to the top-level smart storage switch;
    a top-level wear leveler, reading the maximum WLC and the maximum BBN from the top-level structure register, having a comparator that compares the maximum WLC to a WLC threshold and activates a wear-leveling swap when one of the maximum WLC stored in the structure register exceeds the WLC threshold; and
    a top-level direct-memory access (DMA) engine that is programmed to swap data from a source physical block in a target SCFD connected to a low-level smart storage switch that has the maximum BBN that is a largest BBN stored in the structure register, the DMA engine swapping data to a target physical block in a source SCFD connected to a low-level smart storage switch that has a maximum WLC that is lower than other maximum WLC stored in the structure register;
    an operation unit, in a data path of the top-level smart storage switch, for performing an operation upon data to be stored in a block in the physical blocks of flash memory, wherein the operation is a compression or an encryption;
whereby wear-leveling is performed at a top-level, a mid-level, and within the SCFD.

10. The smart flash device of claim 9 wherein the WLC threshold is increased when the WLC threshold is reached;
  wherein a BBN threshold is increased when the BBN threshold is reached.

11. The smart flash device of claim 9 wherein the controller further comprises a striping scrambler that scrambles assignment of data striped to the plurality of SCFD,
whereby data is scrambled and striped to the SCFD.

12. The smart flash device of claim 11 wherein the top-level smart storage switch scrambles assignment of data to the plurality of low-level smart storage switches;
wherein the low-level smart storage switches each scramble assignment of data to the plurality of SCFD attached to the low-level smart storage switch,
whereby data assignments are scrambled at two levels of smart storage switches.

13. The smart flash device of claim 11 wherein the controller further comprises a security key driver and a key storage, wherein a password or challenge number from the host is verified using a security algorithm executing on the controller.

14. The smart flash device of claim 13 wherein program execution on the host is disabled when the controller is unable to verify the password or challenge number.

15. A multi-level flash device comprising:
a top-level smart storage switch comprising a smart storage switch connected upstream to a host and downstream to a plurality of second-level smart storage switches;
wherein a second-level smart storage switch in the plurality of second-level smart storage switches comprises a smart storage switch connected downstream to a plurality of endpoint devices and upstream to the top-level smart storage switch;
wherein an endpoint device comprises a single-chip flash device (SCFD) having physical blocks of flash memory;
wherein the smart storage switch comprises:
downstream means for connecting to a plurality of downstream devices;
upstream means for connecting to an upstream device;
controller means for dividing upstream data into a plurality of stripes, each stripe being sent to a different downstream device;
structure register means for storing wear-level counts and bad-block counts received from downstream devices;
upstream reporting means for reporting a maximum of the wear-level counts to the upstream device and for reporting a maximum of the bad-block counts to the upstream device;
wear leveling means for swapping physical blocks of two downstream devices selected using the wear-level counts and bad-block counts stored in the structure register means,
encryptor/decryptor means, in a data path of the top-level smart storage switch, for encrypting data to be stored in a block in the physical blocks of flash memory, and for decrypting data read from a block in the physical blocks of flash memory,
whereby wear leveling is performed on multiple levels.

16. The multi-level flash device of claim 15 wherein the smart storage switch further comprises:
security means for executing a security function on an input number to generate an answer number, and for comparing the answer number to an expected answer to enable access to downstream SCFD or execution of a program on the host.

17. The multi-level flash device of claim 16 wherein the controller means further comprises:
scrambling means for scrambling assignment of stripes to downstream devices in a random sequence,
whereby data is scrambled on multiple levels during striping.

18. The multi-level flash device of claim 17 wherein the wear-leveling means further comprises:
register read means for reading the maximum WLC and a maximum BBN from the structure register means;
compared means for comparing the maximum WLC to a WLC threshold and for activating a wear-leveling swap when one of the maximum WLC stored in the structure register means exceeds the WLC threshold; and
direct-memory access (DMA) engine means, programmed to swap data from a source physical block in a target SCFD connected to a second-level smart storage switch that has the maximum BBN that is a largest BBN stored in the structure register means, for swapping data to a target physical block in a source SCFD connected to a second-level smart storage switch that has a maximum WLC that is lower than other maximum WLC stored in the structure register means.

* * * * *